United States Patent
Park et al.

(10) Patent No.: US 12,294,435 B2
(45) Date of Patent: May 6, 2025

(54) ELECTRONIC DEVICE FOR SELECTING BEAM AND METHOD THEREOF

(71) Applicant: Samsung Electronics Co., Ltd., Gyeonggi-do (KR)

(72) Inventors: Daehee Park, Gyeonggi-do (KR); Chonghwa Seo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 410 days.

(21) Appl. No.: 17/736,673

(22) Filed: May 4, 2022

(65) Prior Publication Data

US 2022/0352960 A1    Nov. 3, 2022

Related U.S. Application Data

(63) Continuation of application No. PCT/KR2022/005773, filed on Apr. 22, 2022.

(30) Foreign Application Priority Data

May 3, 2021    (KR) .................. 10-2021-0057447

(51) Int. Cl.
*H04W 4/00*    (2018.01)
*H04B 7/06*    (2006.01)
*H04B 7/08*    (2006.01)

(52) U.S. Cl.
CPC ......... *H04B 7/0695* (2013.01); *H04B 7/0617* (2013.01); *H04B 7/086* (2013.01)

(58) Field of Classification Search
CPC ..... H04B 7/0695; H04B 7/0617; H04B 7/086
(Continued)

(56) References Cited

U.S. PATENT DOCUMENTS

| 7,183,995 B2 | 2/2007 | Pleva et al. |
| 9,712,222 B2 | 7/2017 | Kang et al. |

(Continued)

FOREIGN PATENT DOCUMENTS

| KR | 10-1005670 | 1/2011 |
| KR | 10-1546852 | 8/2015 |

(Continued)

OTHER PUBLICATIONS

International Search Report dated Jul. 22, 2022 issued in counterpart application No. PCT/KR2022/005773, 10 pages.

*Primary Examiner* — Chuong T Ho
(74) *Attorney, Agent, or Firm* — The Farrell Law Firm, P.C.

(57) ABSTRACT

Disclosed is an electronic device including an antenna module comprising a plurality of antenna elements, and a processor operatively connected to the antenna module, wherein the processor is configured to form a plurality of reception beams by selecting a first number of antenna elements among the plurality of antenna elements, receive a first signal from an external device using the plurality of reception beams, select a second number of antenna elements that are used to transmit a signal to an external device, the second number being less than the first number, identify beam set information related to a plurality of transmission beam sets capable of being formed using the second number of antenna elements, select, based on quality information of the first signal and the beam set information, at least one transmission beam from the transmission beam sets, and transmit a second signal to the external device using the selected transmission beam.

17 Claims, 15 Drawing Sheets

(58) Field of Classification Search
USPC .................................................. 370/329, 330
See application file for complete search history.

(56) References Cited

U.S. PATENT DOCUMENTS

| | | | |
|---|---|---|---|
| 10,218,422 | B2 | 2/2019 | Raghavan et al. |
| 10,666,335 | B2 | 5/2020 | Lee et al. |
| 2017/0026962 | A1 | 1/2017 | Liu et al. |
| 2017/0156067 | A1* | 6/2017 | Huang ............... H04B 7/06952 |
| 2019/0239233 | A1* | 8/2019 | Ryu ................... H04W 72/541 |
| 2020/0053800 | A1 | 2/2020 | Deng et al. |
| 2020/0145079 | A1 | 5/2020 | Marinier et al. |
| 2020/0336921 | A1* | 10/2020 | Yerramalli .......... H04W 72/046 |
| 2020/0382194 | A1* | 12/2020 | Park ................... H04W 72/046 |
| 2020/0412425 | A1* | 12/2020 | Laghate ............... H04B 7/0626 |
| 2021/0167837 | A1 | 6/2021 | Grobmann et al. |
| 2023/0361817 | A1* | 11/2023 | Cao .................... H04W 72/046 |

FOREIGN PATENT DOCUMENTS

| | | |
|---|---|---|
| KR | 1020150143421 | 12/2015 |
| KR | 10-2061228 | 12/2019 |
| KR | 10-2365184 | 2/2022 |
| WO | WO 2019/101291 | 5/2019 |
| WO | WO 2020/020453 | 1/2020 |
| WO | WO 2020/101757 | 5/2020 |

* cited by examiner

FIG. 12
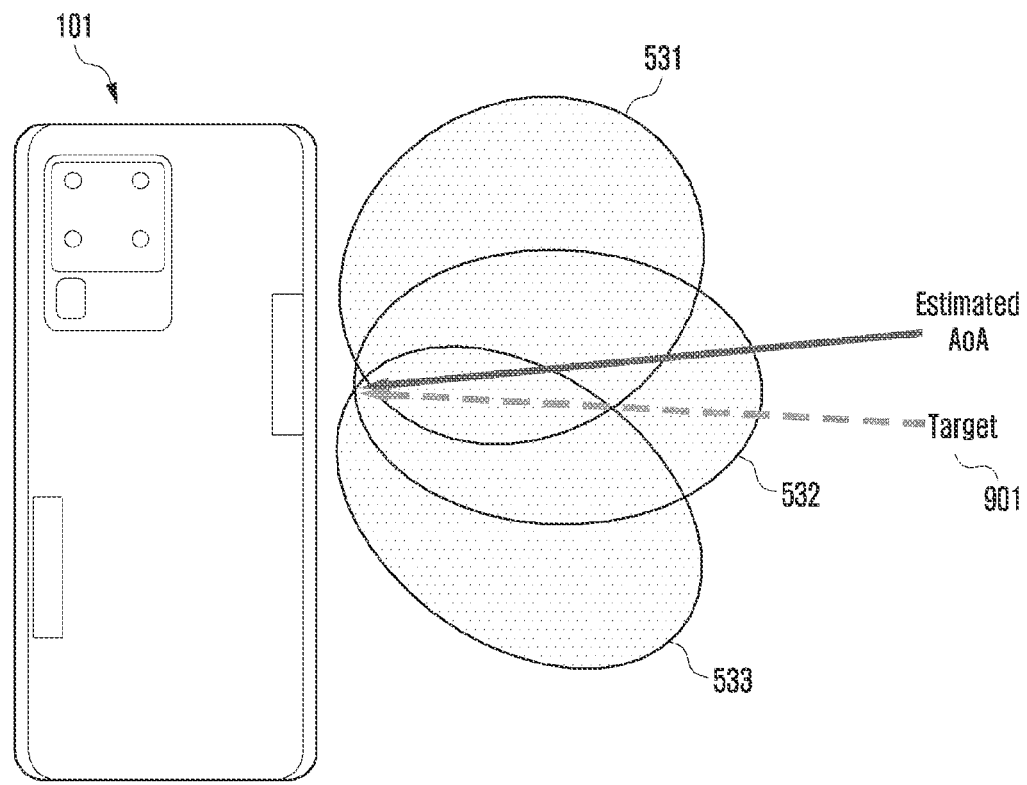
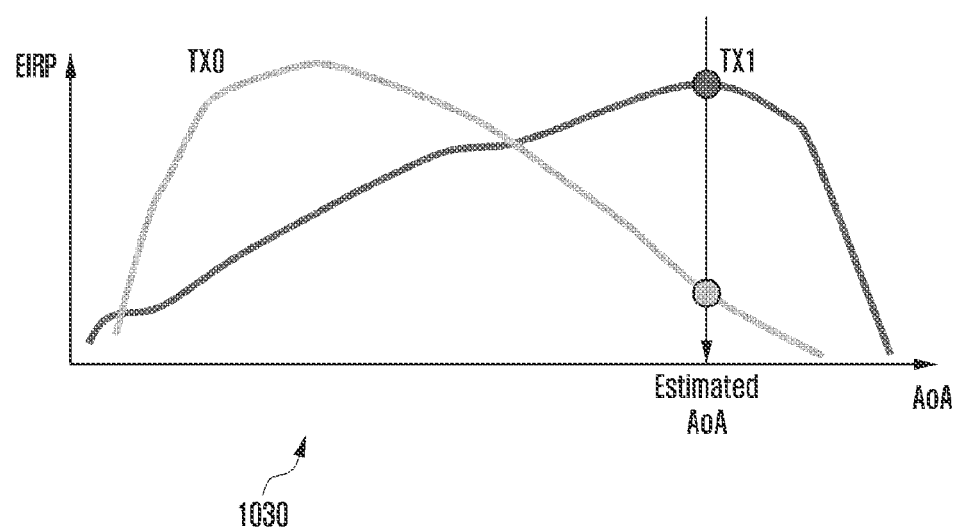

ELECTRONIC DEVICE FOR SELECTING BEAM AND METHOD THEREOF

PRIORITY

This application is a Bypass Continuation Application of international Application No. PCT/KR2022/005773, which was filed on Apr. 22, 2022, and is based on and claims priority under 35 U.S.C. § 119 to Korean Patent Application No. 10-2021-0057447, which was filed in the Korean Intellectual Property Office on May 3, 2021, the entire disclosure of each of which is incorporated herein by reference.

BACKGROUND

1. Field

The disclosure relates generally to an electronic device, and more particularly, to a method and apparatus for selecting a transmission beam by an electronic device.

2. Description of Related Art

To meet the demand for wireless data traffic which has steadily increased since the deployment of the fourth generation (4G) communication systems, efforts have been made to develop an improved fifth generation (5G) or pre-5G communication system, also referred to as a beyond 4G network communication system or a post long term evolution (LTE) system. The 5G communication system is considered to be implemented in 6 gigahertz (GHz) bands, lower frequency bands such as 1.8 GHz or 3.5 GHz bands, or higher frequency bands such as 28 GHz or 39 GHz bands, so as to achieve higher data rates.

To decrease propagation loss of the radio waves and increase the transmission distance, beamforming, massive multiple-input multiple-output (massive MIMO), full dimensional MIMO (FD-MIMO), array antenna, analog beam forming, and large-scale antenna techniques have been discussed in 5G communication systems.

In 5G communication systems, a base station and a user equipment (UE) may perform communication using a beam having directionality, in order to correct a relatively high path loss. If beamforming is used, the base station and the UE may need to select an optimal transmission and/or reception beam to be used for transmitting and/or receiving a signal. For example, the base station and the UE may measure the received signal strengths of all available beam combinations. An optimal beam may include a transmission beam and/or reception beam included in a combination of beams having the highest received signal strength.

If beamforming is performed using a plurality of antennas, excessive heat is produced and excessive current may be consumed. Conventionally, in an attempt to cure the heat or low-power issue, a method of decreasing the number of antennas that are driven has been considered. However, in the conventional art, the number of transmission antennas and the reception antennas may be reduced in order to satisfy beam correspondence by matching a transmission beam and a reception beam. Doing so reduces the throughput of a reception antenna that has minimal impact on power consumption and also deteriorates a data reception rate in a downlink.

As such, there is a need in the art for a method and apparatus for more accurately and reliably selecting beams in wireless communication.

SUMMARY

The disclosure has been made to address at least the above-mentioned problems and/or disadvantages and to provide at least the advantages described below.

Accordingly, an aspect of the disclosure is to provide a method and apparatus that maintains the number of driven reception antennas and reduces the number of transmission antennas, so as to maintain a processing rate in the downlink.

Another aspect of the disclosure is to provide a method and apparatus that satisfies beam correspondence when a low-power mode and/or excessive heat occurs while an electronic device performs communication.

In accordance with an aspect of the disclosure, an electronic device may include an antenna module comprising a plurality of antenna elements, and a processor operatively connected to the antenna module, wherein the processor is configured to form a plurality of reception beams by selecting a first number of antenna elements among the plurality of antenna elements, receive a first signal from an external device using the plurality of reception beams, select a second number of antenna elements that are used to transmit a signal to an external device, the second number being less than the first number, identify beam set information related to a plurality of transmission beam sets capable of being formed using the second number of antenna elements, select, based on quality information of the first signal and the beam set information, at least one transmission beam from the transmission beam sets, and transmit a second signal to the external device using the selected transmission beam.

In accordance with an aspect of the disclosure, a method of selecting, by an electronic device, a transmission beam for an external device, includes forming a plurality of reception beams by allocating a first number of antenna elements to a reception antenna, receiving a first signal from an external device using the plurality of reception beams, allocating a second number of antenna elements to a transmission antenna, the second number being less than the first number, identifying beam set information related to a plurality of transmission beam sets that the transmission antenna is capable of forming based on the second number of antenna elements, selecting, based on quality information of the first signal and the beam set information, at least one transmission beam from the transmission beam sets, and transmitting a second signal to the external device using the selected transmission beam.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 12 illustrates an operation of selecting a transmission beam using an estimated AoA and an effective isotropically radiated power (EIRP) distribution for each transmission beam according to an embodiment;

DETAILED DESCRIPTION

Figure 1:
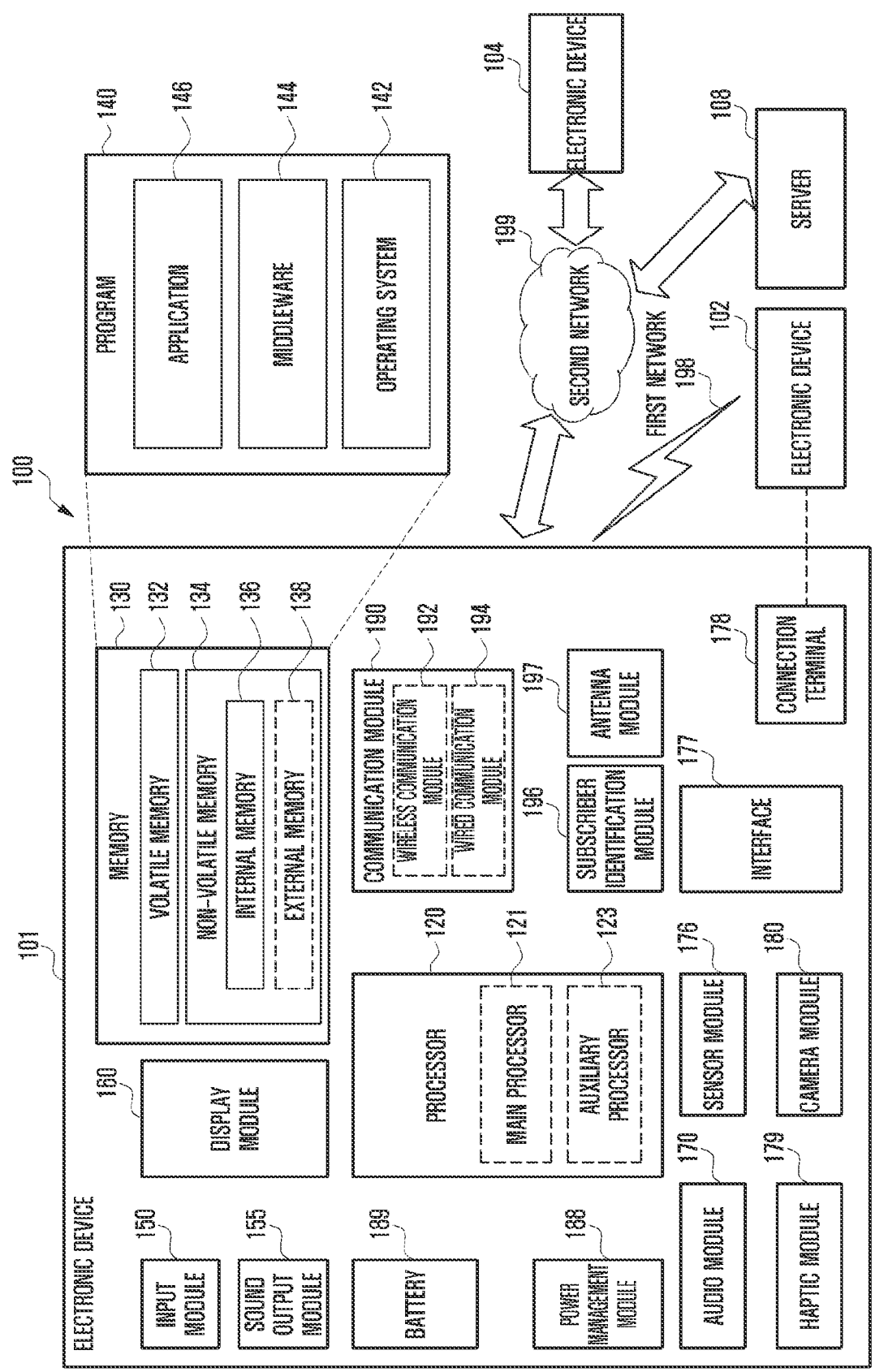
FIG. 1 illustrates an electronic device in a network environment according to an embodiment.

Hereinafter, embodiments of the disclosure will be described in detail with reference to the accompanying drawings. Descriptions of well-known functions and/or configurations will be omitted for the sake of clarity and conciseness.

The electronic device disclosed herein may be one of various types of devices including a portable communication device (e.g., a smartphone), a computer device, a portable multimedia device, a portable medical device, a camera, a wearable device, or a home appliance. The electronic device disclosed herein is not limited to the above-described devices.

It should be appreciated that various embodiments of the disclosure and the terms used therein are not intended to limit the technological features set forth herein to particular embodiments and include various changes, equivalents, or alternatives for a corresponding embodiment.

With regard to the description of the drawings, similar reference numerals may be used to designate similar or relevant elements. A singular form of a noun corresponding to an item may include one or more of the items, unless the relevant context clearly indicates otherwise. As used herein, each of such phrases as A or B, at least one of A and B, at least one of A or B, A, B, or C, at least one of A, B, and C, and at least one of A, B, or C, may include all possible combinations of the items enumerated together in a corresponding one of the phrases. As used herein, such terms as a first, a second, the first, and the second may be used to simply distinguish a corresponding element from another and do not limit the elements in importance or order. It is to be understood that if a first element is referred to, with or without the term operatively or communicatively, as coupled with/to or connected with/to another element (e.g., a second element), this indicates that the first element may be coupled/connected with/to the second element directly (e.g., wiredly), wirelessly, or via a third element.

FIG. 1 is a block diagram illustrating an electronic device 101 in a network environment 100 according to various embodiments. Referring to 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) card 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive e.g., sleep) state, or together with the main processor 121 while the main processor 121 is in an active state executing an application). According to an embodiment, the auxiliary processor 123 (e.g., an image signal processor or a communication processor) may be implemented as part of another component (e.g., the camera module 180 or the communication module 190) functionally related to the auxiliary processor 123.

According to an embodiment, the auxiliary processor 123 (e.g., the neural processing unit) may include a hardware structure specified for artificial intelligence model processing. An artificial intelligence model may be generated by machine learning. Such learning may be performed., e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include a microphone, a mouse, a keyboard, a key (e.g., a button), or a digital pen (e.g., a stylus pen).

The sound output module 155 may output sound signals to the outside of the electronic device 101. The sound output module 155 may include a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of a power management integrated circuit (PMIC).

The battery 189 may supply power to at least one component of the electronic device 101. According to an embodiment, the battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM card 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
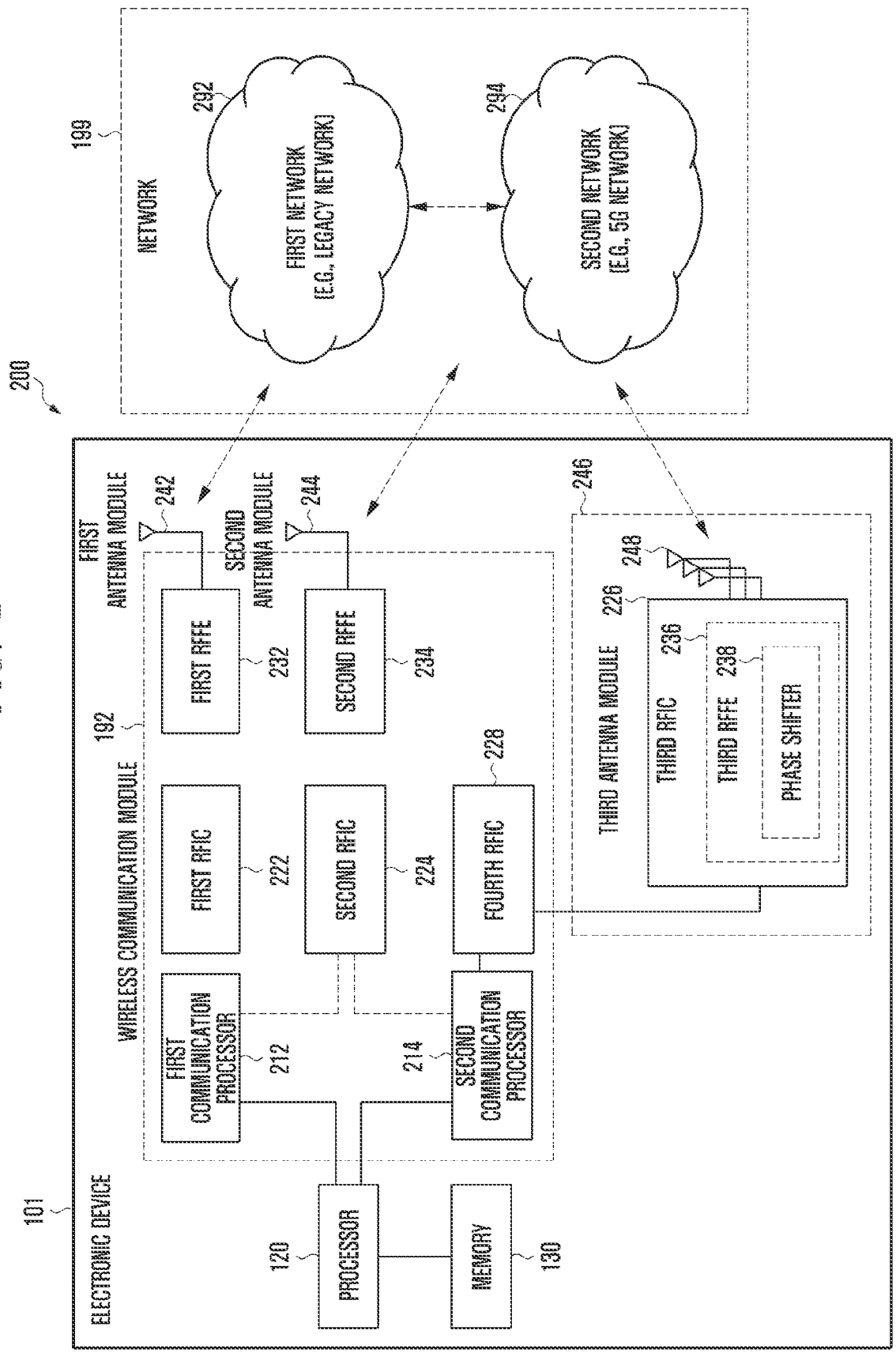
FIG. 2 illustrates an electronic device for supporting legacy network communication and 5G network communication according to an embodiment.

FIG. 2 is a block diagram illustrating an electronic device in a network environment including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE, 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or LTE network. The second communication processor 214 may establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RE signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third MC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components the processor 120, the first communication processor 212, or the second communication processor 214).

Figure 3:
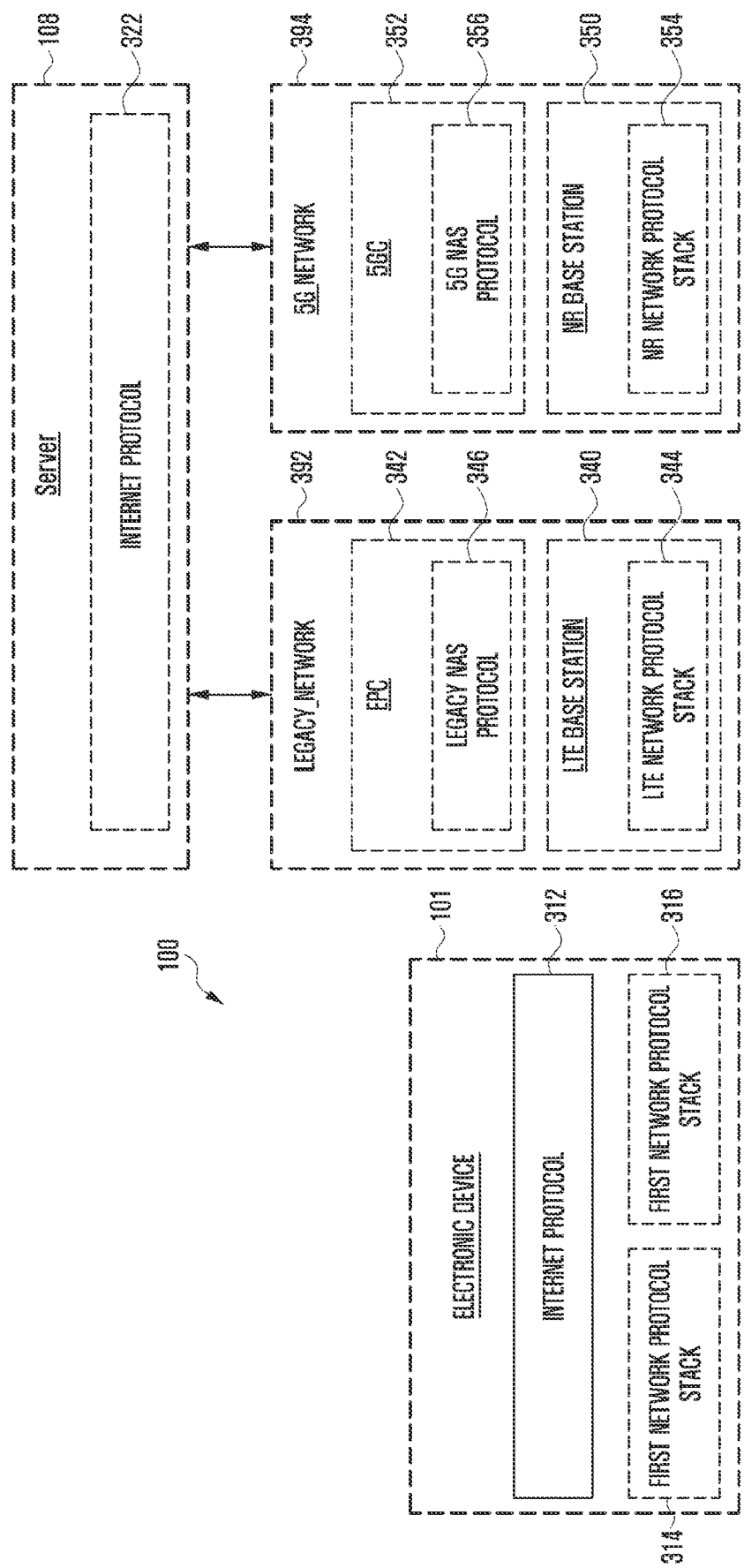
FIG. 3 illustrates the protocol stack structure of a network of 4G communication and/or 5G communication according to an embodiment.

FIG. 3 illustrates a protocol stack structure of the network 100 of legacy communication and/or 5G communication according to an embodiment.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Internet communication associated with the server 108 through the Internet protocol 312 (for example, a TCP, a UDP, or an IP). The Internet protocol 312 may be executed by a main processor (for example, the main processor 121 of FIG. 1) included in the electronic device 101.

According to another embodiment, the electronic device 101 may perform wireless communication with the legacy network 392 through the first communication protocol stack 314, According to another embodiment, the electronic device 101 may perform wireless communication with the 5G network 394 through the second communication protocol stack 316. The first communication protocol stack 314 and the second communication protocol stack 316 may be executed by one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to another embodiment, the server 108 may include an edge computing server (or a mobile edge computing (MEC) server) located inside at least one of the legacy network or the 5G network 394.

The legacy network 392 may include an LTE eNode 13 (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356, The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of security control, bearer setup, authentication, registration, or mobility management. The user data may include the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map data to a radio channel for transmitting and receiving the data and perform a hybrid automatic repeat request (HARQ) for error correction. The RLC layer may perform data concatenation, segmentation, or reassembly, and data sequence identification, reordering, or duplication detection. The PDCP layer may perform an operation related to ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control data related to radio bearer setup, paging, or mobility management. The NAS may process a control message related to authentication, registration, or mobility management.

Figure 4:
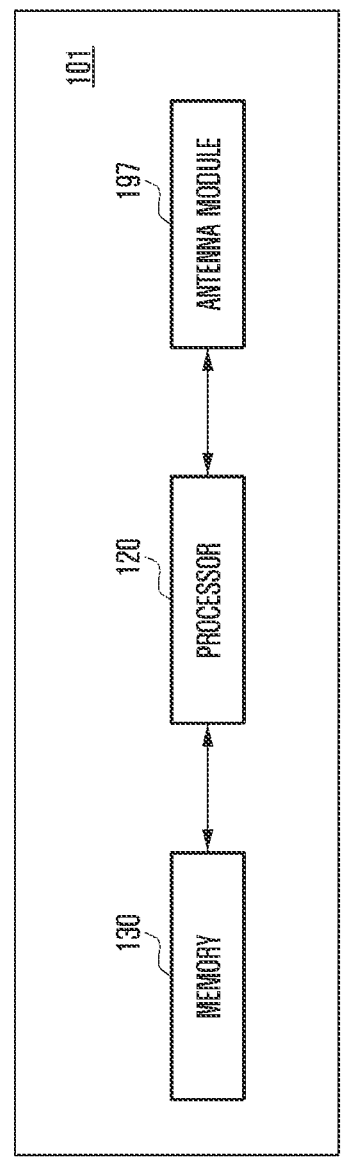
FIG. 4 illustrates an electronic device for selecting a transmission beam according to an embodiment.

FIG. 4 illustrates an electronic device for selecting a transmission beam according to an embodiment. The electronic device 101 of FIG. 4 may include at least some of the functions and/or elements of the electronic device 101 of FIG. 1, 2, or 3.

Referring to FIG. 4, the electronic device 101 may include the processor 120, the memory 130, and/or the antenna module 197.

The memory 130 may store various data used by at least one element (e.g., the processor 120).

The memory 130 may store various data used by the processor 120 or the memory 197 of the electronic device 101. The memory 130 may store various instructions executable by the processor 120, such as at least one piece of information among information related to a plurality of beam sets usable for estimating the incident direction of a received signal, beam set information related to a plurality of transmission beams and/or reception beams usable by the electronic device 101 for communication with an external device, beam code information (beam codebook) related to a weight that controls each of a plurality of antenna elements included in the antenna module 197 for forming a plurality of transmission beams and/or reception beams included in a beam set, beam set information corresponding to the number of selected antenna elements, information related to at least one variable of a beam selection scheme based on an AoA, a table storing a relationship between a difference in received signal strength and an incident direction, information (correspondence information) in which a plurality of transmission beams and a plurality of reception beams are mapped to each other, information related to a distribution of a received signal strength for each reception beam and for each AoA, and/or information related to a signal radiation strength for each transmission beam for each AoA.

The antenna module 197 may include at least one antenna, and may transmit a wireless signal and/or power to a base station or may receive a signal from the base station. The antenna module 197 may include at least some of the configurations and/or functions of the antenna module 197 of FIG. 1, the first antenna module 242, the second antenna module 244, and/or the antenna 248 of FIG. 2. The antenna module 197 may include an array antenna including a plurality of antenna elements, transmission beams, and reception beams (e.g., beam forming) according to control performed by the processor 120. Only some antenna elements selected from among the plurality of antenna elements included in the antenna module 197 may operate simultaneously, or all of the antenna elements may operate simultaneously. The antenna module 197 may operate as a transmission antenna and a reception antenna, simultaneously. The antenna module 197 may include a plurality of array antennas. Some of the array antennas may operate as transmission antennas while others may operate as reception antennas. The antenna module 197 may alternately operate as a transmission antenna and a reception antenna, at predetermined periods.

The processor 120 may be operatively connected to the memory 130 and/or antenna module 197. The processor 120 may include an application processor (AP) anchor a communication processor (CP) (e.g., the sub-processor 123 of FIG. 1, the first communication processor 212 and/or the second communication processor 214 of FIG. 2), The processor 120 may control the antenna module 197, and may select a plurality of antenna elements for receiving a first signal. The processor 120 may perform control so as to select and operate at least a first number of antenna elements of the plurality of antennas included in the antenna module 197. The processor 120 may select an antenna element corresponding to a predetermined value included in beam set information for forming a plurality of beams. The processor 120 may form a reception beam by controlling selected antenna elements. The processor 120 may control a plurality of antenna elements based on beam set information. The processor 120 may form a plurality of reception beams having varying directionalities and angles. The processor 120 may control phase shifters (e.g., the phase shifter 238 of FIG. 2) respectively corresponding to the plurality of antenna elements, and may form a plurality of reception beams.

The processor 120 may receive a first signal from the base station using a plurality of reception beams formed by controlling the antenna module 197. The first signal may be received by the electronic device 101 from the base station in order to perform wireless communication with an external electronic device 104. The first signal may include a reference signal when the electronic device 101 performs transmission and/or reception of a signal with an external device. The processor 120 may receive the first signal from the outside using a plurality of formed reception beams. The first signal may be in the mmWave band.

The processor 120 may determine whether a low-power mode needs to be started or maintained. The processor 120 may identify the charged level of a battery 189 using a power management module 188 and may identify whether a low-power mode is needed. The processor 120 may identify the heat and/or the amount of power consumed by the antenna module 197, and may determine whether a low-power mode is needed based on whether the heat and/or the amount of power consumed exceeds a predetermined threshold value. The processor 120 may receive an input for executing a low-power mode via an input module 150 and may execute the low-power mode based on the received input.

The processor 120 may control the antenna module 197 in the low-power mode and may select a plurality of antenna elements for transmitting a second signal. The processor 120 may perform control so as to select and operate at least a second number of antenna elements of the plurality of antennas included in the antenna module 197. The second number may be included in beam set information for forming a plurality of beams. The second number may be less than the first number.

The processor 120 may identify beam set information related to a plurality of transmission beams that are capable of being formed to correspond to the selected antenna elements. The beam set information may include information related to transmission beams that correspond to the second number of selected antenna elements. The processor 120 may identify beam set information stored in the memory 130 and corresponding to the second number of antenna elements. The beam set information corresponding to the second number of antenna elements may be different from the beam set information corresponding to the first number of antenna elements. Transmission beams and/or reception beams produced based on different pieces of beam set information may have varying forms, directionalities, sharpness, diameters, and/or distance ranges.

The processor 120 may select a transmission beam in order o transmit a signal (e.g., a second signal) to an external device. The processor 120 may select at least one of one or more transmission beams included in beam set information. The processor 120 may select a transmission beam based on the quality information of a received first signal. Quality information may be related to the reception strength of a first signal, a change in reception strength, and the signal to noise ratio (SNR) information of the first signal. The information related to reception strength may include an RSRP, a received signal strength indicator (RSSI), and/or a reference signal received quality (RSRQ).

The processor 120 may select a transmission beam based on correspondence information in which a plurality of transmission beams and a plurality of reception beams are mapped to each other. The memory 130 may correspondence information in which reception beam set information associated with a reception beam set capable of being formed by the first number of antenna elements and transmission beam set information associated with a transmission beam set capable of being formed by the second number of antenna elements are mapped to each other. The correspondence information may include information related to a correspondence relationship between one or more reception beams and one or more transmission beams. The processor 120 may select, based on the correspondence information, a transmission beam corresponding to a predetermined reception beam, and the selected transmission beam may be a transmission beam that is most similar to the reception direction of the reception beam. The processor 120 may select a reception beam based on the quality information of a first signal. For example, the processor 120 may compare RSRPs among the plurality of formed reception beams and may select a reception beam based on the reception strength of a first signal. The processor 120 may select, based on a selected reception beam and correspondence information, a transmission beam mapped to the selected reception beam.

The processor 120 may select a transmission beam based on estimation of an AoA. The processor 120 may identify first information and second information. The first information may be related to an RSRP distribution of a first signal for each AoA. For example, an RSRP distribution may include the distribution of the reception strength of a first signal that each reception beam formed by the electronic device 101 is capable of receiving as an AoA changes. The first information may be information stored in advance in the memory 130. The second information may be information related to a real-time RSRP distribution. A real-time RSRP distribution may include information associated with the reception strength of a first signal that each reception beam receives in real time. The processor 120 may produce and/or identify the second information in real time. The processor 120 may calculate and/or identify a correlation between the first information and the second information, and may estimate the AoA of a received first signal. The first information may include information related to an RSRP distribution for each AoA and each reception beam, and the second information may include an RSRP value for each reception beam in real time, and thus, an AoA may be estimated by identifying a correlation.

For example, an AoA corresponding to a distribution having the highest correlation with the second information among AoA-based distributions included in the first information may be estimated as the AoA of the first signal. The processor 120 may select a transmission beam based on the estimated AoA of the first signal and third information related to a radiation strength (e.g., an EIRP) for each AoA, for each of a plurality of transmission beams that the electronic device 101 is capable of forming. The memory 130 may pre-store the third information. The processor 120 may select a transmission beam having the highest radiation strength at an estimated AoA, from a beam set corresponding to a second number of antenna elements.

If it is determined that a low-power mode is not needed if a normal mode is executed, the processor 120 may select a first number of antenna elements from among a plurality of antenna elements included in the antenna module 197 in order to form a transmission beam. In the case of a normal mode, the processor 120 may equally select antenna elements for forming a reception beam and antenna elements for forming a transmission beam. Beam set information related to a reception beam that the first number of antenna elements are capable of forming and beam set information related to a transmission beam may be identical, and the formed transmission and reception beams are in a one-to-one correspondence.

The processor 120 may select a transmission beam based on the one-to-one correspondence between a transmission and a reception beam. The processor 120 may select at least one reception beam among a plurality of reception beams based on the reception strength of a first signal. The plurality of reception beams may have different reception strengths of a first signal, and the processor 120 may identify the distribution of reception strengths in real time, and may select at least one reception beam in order of strongest reception strength. The processor 120 may select a transmission beam that one-to-one matches at least one selected reception beam, from among a plurality of transmission beams.

The processor 120 may form a selected transmission beam by controlling the antenna module 197. The processor 120 may transmit a second signal to a base station using the formed transmission beam. The second signal may be an up-link signal transmitted to the base station.

The processor 120 may receive a signal of an additional frequency band from the base station. If the base station desires to perform CA, the electronic device 101 may receive a signal of an additional frequency band different from the frequency band of a first signal. When a signal of an additional frequency band is received, the processor 120 may additionally form a reception beam of the aggregated frequency band. Beam set information corresponding to an additional frequency band may be different from the beam set information corresponding to an existing frequency band. The processor 120 may form a plurality of reception beams corresponding to an additional frequency band in addition to the beam set corresponding to the existing frequency band. In order to transmit a signal of an additional frequency band to an external device, the processor 120 may control the antenna module 197 and may select a third number of antenna elements. The processor 120 may identify additional beam set information corresponding to the third number of selected antenna elements. The additional beam set information may include information related to a plurality of transmission beams corresponding to the additional frequency band. When CA initiates, the electronic device 101 may be performing transmission or reception of a signal of the existing frequency band with an external device, using a reception beam formed in advance. Therefore, CA may be initiated after reception of a first reference signal of the existing frequency band from an external device.

The memory 130 may store information associated with the AoA of a first signal estimated based on the reception strength of a first signal. For example, while performing transmission and reception of a signal with an external device via the existing frequency band, the processor 12( ) may estimate the AoA of a first signal received from the external device. The estimation of an AoA may be performed before initiation of CA, at the time of initiating CA, or after initiation of CA. The processor 120 may select, based on an estimated AoA, at least one beam among a plurality of added transmission beams. The memory 130 may store, in advance, correspondence information between an additional beam set and an estimated AoA. The processor 120 may select a transmission beam using an estimated AoA and additional beam set information based on the correspondence information. The processor 120 may estimate the AoA of a signal received from the base station using at least one of the reception beams of the existing frequency band, and may select a transmission beam of an additional frequency and using the estimated AoA. The transmission beam may be selected based on the EIRP at the estimated AoA, for each of the transmission beams included in an additional transmission beam set.

Figure 5:
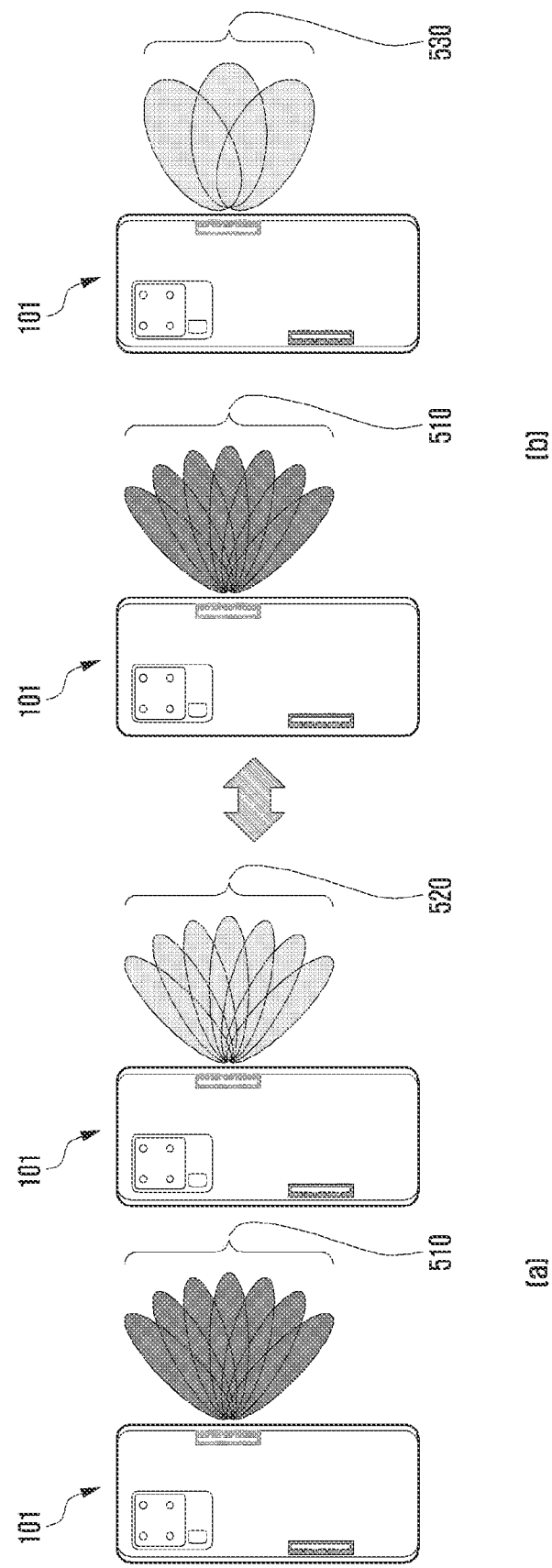
FIG. 5 illustrates symmetry and asymmetry between a transmission beam and a reception beam according to an embodiment.

FIG. 5 illustrates symmetry and asymmetry between a transmission beam and a reception beam according to an embodiment.

Referring to sections [a] and [b] in FIG. 5, the electronic device 101 may form a plurality of reception beams 510 and a plurality of transmission beams 520 and 530. The electronic device 101 may control an antenna module 197 and may form a reception beam set 510 including a plurality of reception beams. The electronic device 101 may select at least a first number of antenna elements of the plurality of antenna elements included in the antenna module 197, so as to form the reception beam set 510. The electronic device 101 may form the reception beam set 510 based on beam set information for forming a plurality of reception beams. The beam set information may include beam code information (beam codebook) related to a weight that controls each of the plurality of antenna elements included in the antenna module 197 for forming the reception beam set 510. The beam set information may be determined based on the number of antenna elements selected for forming the reception beam set 510. For example, beam sets formed using a different number of antenna elements may vary, and beam sets formed based on different beam set information may be included.

The electronic device 101 may control an antenna module 197 and may form the transmission beam set 520 and 530 including a plurality of transmission beams. The electronic device 101 may select at least a first or second number of antenna elements of the plurality of antenna elements included in the antenna module 197, so as to form the transmission beam set 520 and 530 based on beam set information for forming a plurality of transmission beams. The beam set information may include beam code information (beam codebook) related to a weight that controls each of a plurality of antenna elements included in the antenna module 197 for forming the transmission beam set 520 and 530.

Referring to sections [a] and [b] of FIG. 5, transmission beam set information may be determined based on the number of selected antenna elements. For example, beam sets formed using a different number of antenna elements may vary, and beam sets formed based on different beam set information may be included.

Referring to section [a] of FIG. 5, the electronic device 101 may select a first number of antenna elements and form the first transmission beam set 520 based on the beam set information corresponding to the first number of antenna elements. In a normal mode different from a power saving mode, the electronic device 101 may form the first transmission beam set 520. The plurality of transmission beams included in the first transmission beam set 520 may be in a one-to-one correspondence with the plurality of reception beams included in the reception beam set 510 corresponding to the first number of antenna elements. In the normal mode, the electronic device 101 may form, based on the same beam set information, the reception beam set 510 and the first transmission beam set 520.

Referring to section [b] of FIG. 5, the electronic device 101 may select a second number of antenna elements and may form the second transmission beam set 530. The second number may be less than the first number. For example, the electronic device 101 may form the second transmission beam set 530 based on beam set information corresponding to the second number of antenna elements which is less than the first number of antenna elements. In a power saving mode, the electronic device 510 may drive only the second number of antenna elements by forming the second transmission beam set 530. The beam set information corresponding to the first number of antenna elements may be different from the beam set information corresponding to the second number of antenna elements. Therefore, in the case of the power saving mode, the second transmission beam set 530 formed by the electronic device 101 may be asymmetric to the reception beam set 510 so as not to be in a one-to-one correspondence with the beams included in the reception beam set 510.

Figure 6:
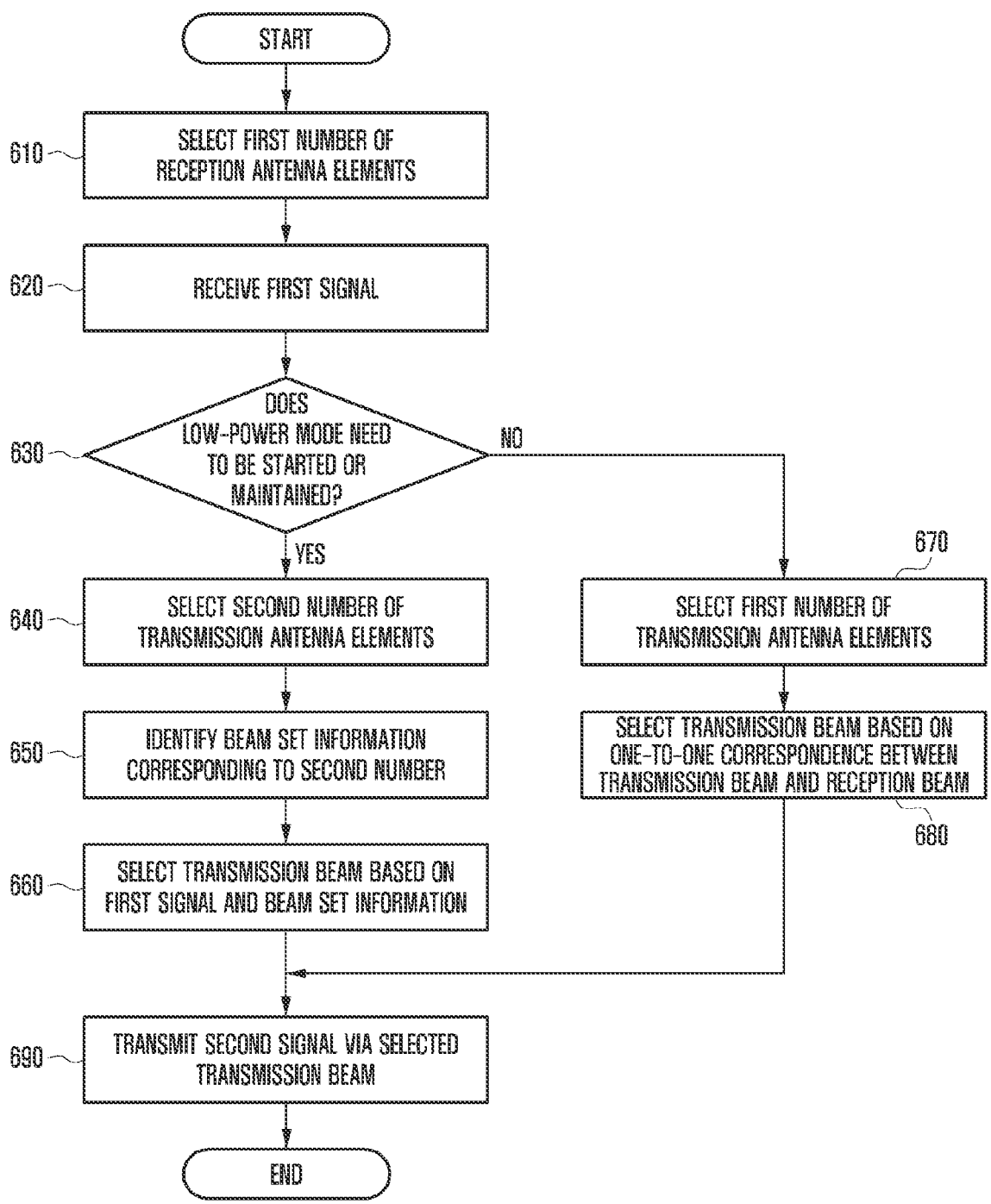
FIG. 6 illustrates an operation of selecting a transmission beam by an electronic device according to an embodiment.

FIG. 6 illustrates an operation of selecting a transmission beam by an electronic device according to an embodiment.

Referring to FIG. 6, each operation that the electronic device 101 performs in order to select a transmission beam may be understood as each operation performed by the processor 120 of the electronic device 101 The steps included in FIG. 6 may be performed in a different order or may be replaced with similar steps.

In step 610, the processor may control an antenna module and may select a plurality of antenna elements for receiving a first signal. The processor may perform control so as to select and operate at least a first number of antenna elements of the plurality of antennas included in the antenna module. The processor may select an antenna element corresponding to a predetermined value included in beam set information for forming a plurality of beams. The processor may form a reception beam by controlling the selected antenna element. The processor may control a plurality of antenna elements based on the beam set information. The processor may form a plurality of reception beams having varying directionalities and angles. The processor may control phase shifters respectively corresponding to the plurality of antenna elements and may form a plurality of reception beams.

In step 620, the processor may receive a first signal from a base station using the plurality of reception beams formed by controlling the antenna module. The first signal may be received by the electronic device 101 from an external device in order to perform wireless communication with an external electronic device. The first signal may include a reference signal to be used when the electronic device 101 performs transmission and/or reception of a signal with an external device. The processor may receive the first signal from the outside using the plurality of formed reception beams. The first signal may include an mmWave band signal.

In step 630, the processor may determine whether a low-power mode needs to be started or maintained. The processor may identify the charged level of a battery using a power management module, and may identify whether a low-power mode is needed. The processor may identify the heat and/or the amount of power consumed by the antenna module, and may determine whether a low-power mode is needed based on whether the heat and/or the amount of power consumed exceeds a predetermined threshold value. The processor may receive an input for executing a low-power mode via an input module and may execute the low-power mode based on the received input. If it is determined that the low-power mode needs to be started and/or maintained, the processor may proceed to step 640. If it is determined that the low-power mode does not need to be started and/or maintained, the processor may proceed to step 670. The processor may proceed to step 640, irrespective of the low power mode. For example, the first number of reception antenna elements and the second number of transmission antenna elements may be determined in advance. Therefore, the processor may identify beam set information based on the number of antenna elements determined in advance, irrespective of the low-power mode.

In step 640, in the low power mode, the processor may control the antenna module, and may select a plurality of antenna elements for transmitting a second signal. The processor may perform control so as to select and operate at least the second number of antenna elements of the plurality of antennas included in the antenna module. The second number may be included in beam set information for forming a plurality of beams and may be less than the first number.

In step 650, the processor may identify beam set information related to a plurality of transmission beams that are capable of being formed based on the selected antenna elements. The beam set information may include information related to transmission beams that correspond to the second number of selected antenna elements. The processor may identify the beam set information stored in a memory. The processor may identify the beam set information corresponding to the second number of antenna elements, which may be different from the beam set information corresponding to the first number of antenna elements. Transmission beams and/or reception beams produced based on different pieces of beam set information may have different forms, directionalities, sharpness, diameters, and/or distance ranges from each other.

In step 660, the processor may select a transmission beam in order to transmit a second signal to an external device. The processor may select at least one of one transmission beam included in the beam set information based on the quality information of the received first signal. The quality information may include information related to the reception strength of the first signal, a change in reception strength, and the SNR of the first signal. The information related to reception strength may include RSRP, an RSSI, and/or an RSRQ.

In step 670, if it is determined that the low-power mode is not needed if a normal mode is executed, the processor may select a first number of antenna elements from among the plurality of antenna elements included in the antenna module in order to form a transmission beam. In the case of the normal mode, the processor may equally select antenna elements for forming a reception beam and antenna elements for forming a transmission beam. Beam set information related to a reception beam that the first number of antenna elements is capable of forming and beam set information related to a transmission beam may be identical, and the formed transmission beam and reception beam may be in a one-to-one correspondence.

In step 680, the processor may select a transmission beam based on the one-to-one correspondence between the transmission and reception beams. The processor may select, based on the reception strength of the first signal, at least one reception beam among the plurality of reception beams. The plurality of reception beams may have different reception strengths of the first signal, and the processor may identify the distribution of reception strengths in real time and may select at least one reception beam in order of strongest reception strength. The processor may select a transmission beam that one-to-one matches at least one selected reception beam, from among the plurality of transmission beams.

In step 690, the processor may form the selected transmission beam by controlling the antenna module and may transmit a second signal to the base station using the formed transmission beam. The second signal may be an up-link signal transmitted to a base station.

Figure 7:
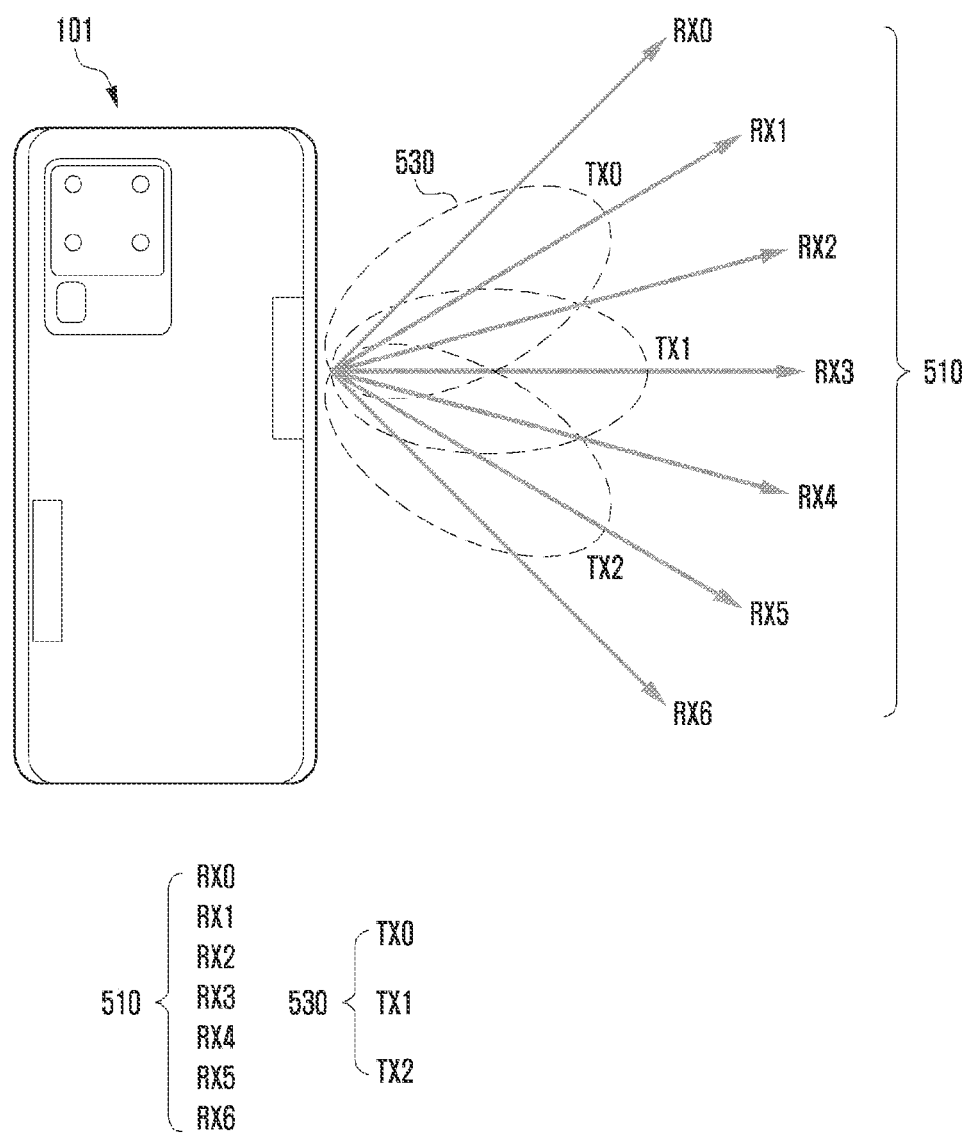
FIG. 7 illustrates an operation of selecting a transmission beam based on correspondence information by an electronic device according to an embodiment.

FIG. 7 illustrates an operation of selecting a transmission beam based on correspondence information by an electronic device according to an embodiment.

Referring to FIG. 7, the electronic device 101 may form the reception beam set 510 including a plurality of reception beams (e.g., RX0, RX1, RX2, RX3, RX4, RX5, and/or RX6). The electronic device 101 may form the reception beam set 510 based on beam set information that is information related to a plurality of reception beams included in the reception beam set 510. The electronic device 101 may form the reception beam set 510 using a first number of selected antenna elements by controlling an antenna module. The first number may be a predetermined value, and the first number of antenna elements may be at least some or all of the plurality of antenna elements included in the antenna module 197. The electronic device 101 may form the reception beam set 510 based on beam set information corresponding to the first number of antenna elements.

The electronic device 101 may form the transmission beam set 530 including a plurality of transmission beams (e.g., TX0, TX1, and/or TX2). Each beam included in the transmission beam set 530 may be formed based on beam set information corresponding to a second number of antenna elements. For example, the beam set information corresponding to the second number of antenna elements may include information related to a plurality of transmission beams, and the electronic device 101 may radiate (e.g., beamforming) at least one of the plurality of transmission beams included in the beam set information. The second number may be a number less than the first number. The electronic device 101 may select the second number of antenna elements from among the plurality of antenna elements included in the antenna module 197, the second number being less than the first number of antenna elements for forming a reception beam. The electronic device 101 may drive antenna elements in a low power mode for transmission, the number of second elements being less than the second number of antenna elements for reception. Thus, the electronic device 101 may maintain the throughput in a downlink and may decrease the amount of power consumed to a low power level.

The electronic device 101 may select a transmission beam based on correspondence information between a plurality of reception beams (e.g., RX0, RX1, RX2, RX3, RX4, RX5, and/or RX6) and a plurality of transmission beams (e.g., TX0, TX1, and/or TX2). The correspondence information may be information in which a plurality of reception beams and a plurality of transmission beams are mapped to each other. The electronic device 101 may consider beam correspondence between a reception beam and a transmission beam, in order to receive a signal from the base station and to transmit a signal to the identical base station. For example, it is necessary to transmit a signal using a transmission beam that corresponds to the location and/or direction of a predetermined reception beam from which the electronic device 101 receives a signal among a plurality of reception beams. The electronic device 101 may pre-store correspondence information in which a plurality of reception beams and a plurality of transmission beams are mapped to each other in the memory 130. In FIG. 7, RX0 and RX1 among the plurality of reception beams may be mapped to TX0 among the transmission beams, RX2, RX3, and RX4 may be mapped to TX1, and RX5 and RX6 may be mapped to TX2. The above-described mapping relationship is as an example, the correspondence information may include correspondence information derived via a different correspondence between each transmission beam and reception beam.

The electronic device 101 may receive a first signal from the base station before selecting a transmission beam based on the correspondence information. The first signal may be a reference signal that the electronic device 101 receives from the outside in order to initiate and/or maintain a connection to a network. The electronic device 101 may receive a first signal and may identify the quality information of the received first signal for each of the plurality of reception beams included in the reception beam set 510. The quality information may include information related to the reception strength of the first signal of the electronic device 101, a change in reception strength, and/or the SNR information of the first signal. The information related to reception strength may include an RSRP, an RSSI, and/or an RSRQ. The electronic device 101 may identify the quality information of the first signal received for each of the plurality of reception beams. The electronic device 101 may select at least one beam among the plurality of reception beams based on the quality information. For example, the electronic device 101 may select a reception beam having the highest reception strength among the reception beams.

The electronic device 101 may select, based on the correspondence information, a transmission beam mapped to the selected reception beam. For example, if a beam having the highest RSRP is RX3 among the reception beams, a transmission beam may be determined to be TX1 based on the correspondence information. The electronic device 101 may form the selected transmission beam and may radiate a second signal to the outside. The second signal may be an uplink that the electronic device 101 radiates to the outside (e.g., a base station) in order to initiate and/or maintain a connection to a network, such as the second network 294.

Figure 8:
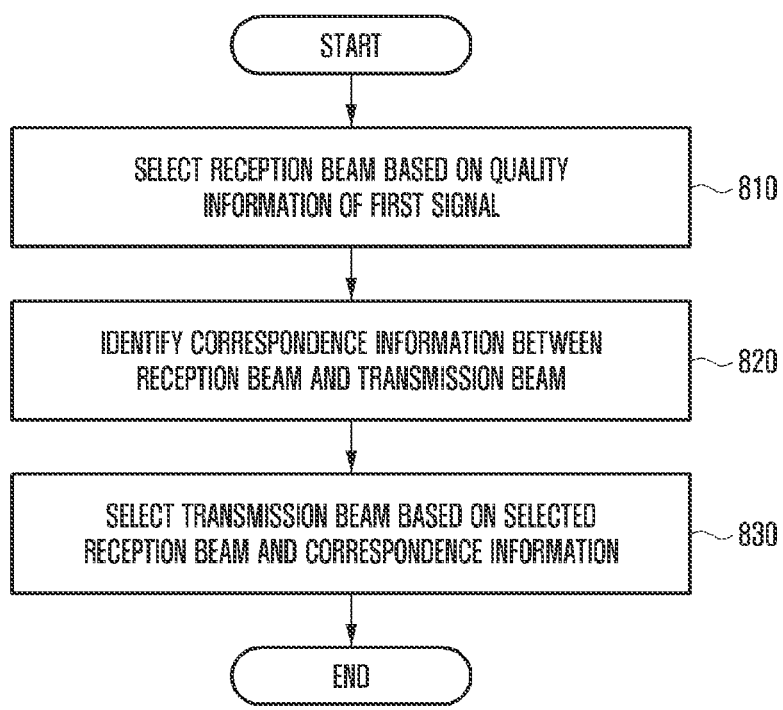
FIG. 8 illustrates an operation of selecting a transmission beam based on correspondence information by an electronic device according to an embodiment.

FIG. 8 illustrates an operation of selecting a transmission beam based on correspondence information by an electronic device according to an embodiment.

Referring to FIG. 8, each operation that the electronic device performs in order to select a transmission beam based on correspondence information may be performed by a processor of the electronic device. The steps included in FIG. 8 may be performed in a different order or may be replaced with similar steps.

In step 810, the processor may select a reception beam based on the quality information of a first signal. The processor may identify the quality information of the first signal received from the base station using each of a plurality of reception beams. The processor may select at least one beam from among the plurality of reception beams based on the quality information. For example, the processor may select a reception beam having the highest reception strength among the reception beams. The processor may receive a first signal and may identify the quality information of the received first signal for each of the plurality of reception beams included in the reception beam set. The quality information may include information related to the reception strength of the first signal of the processor, a change in reception strength, and/or the SNR information of the first signal. The information related to a reception strength may include RSRP, an RSSI, and/or an RSRQ. The processor may identify the quality information of the first signal received for each of the plurality of reception beams. The processor may select at least one beam from among the plurality of reception beams based on the quality information. For example, the processor may select a reception beam having the highest reception strength among the reception beams.

In step 820, the processor may identify correspondence information between the transmission and reception beams. A memory of the electronic device may store correspondence information in which reception beam set information associated with a reception beam set that is capable of being formed by a first number of antenna elements and transmission beam set information associated with a transmission beam set that is capable of being formed by a second number of antenna elements are mapped to each other. The correspondence information may include information in which a plurality of reception beams and a plurality of transmission beams are mapped to each other. The processor may consider beam correspondence between a reception beam and a transmission beam, in order to receive a signal from the base station and to transmit a signal to the identical base station. For example, it is necessary to transmit a signal using a transmission beam that corresponds to the location and/or direction of a predetermined reception beam via which the electronic device receives a signal among a plurality of reception beams. The processor may pre-store, in the memory, correspondence information in which a plurality of reception beams and a plurality of transmission beams are mapped to each other.

In step 830, the processor may select a transmission beam based on the correspondence information. The processor may select, based on the correspondence information, a transmission beam corresponding to a predetermined reception beam, and the selected transmission beam may have the most similar directionality to the reception direction of the reception beam. The processor may select a reception beam based on the quality information of the first signal. For example, the processor may compare an RSRP among the plurality of formed reception beams and may select a reception beam based on the reception strength of the first signal. The processor may receive the first signal and may identify the quality information of the received first signal for each of the plurality of reception beams included in a reception beam set. The quality information may include information related to the reception strength of the first signal of the processor, a change in reception strength, and/or SNR information of the first signal. The information related to a reception strength may include an RSRP, an RSSI, and/or an RSRQ. The processor may identify the quality information of the first signal received for each of the plurality of reception beams. The processor may select at least one beam from among the plurality of reception beams based on the quality information. For example, the processor may select a reception beam having the highest reception strength among the reception beams.

The processor may select, based on the correspondence information, a transmission beam mapped to the selected reception beam. The processor may form the selected transmission beam and may radiate a second signal to the outside. The second signal may be an uplink that the processor radiates to the base station in order to initiate and/or maintain a connection to a network.

Figure 9:
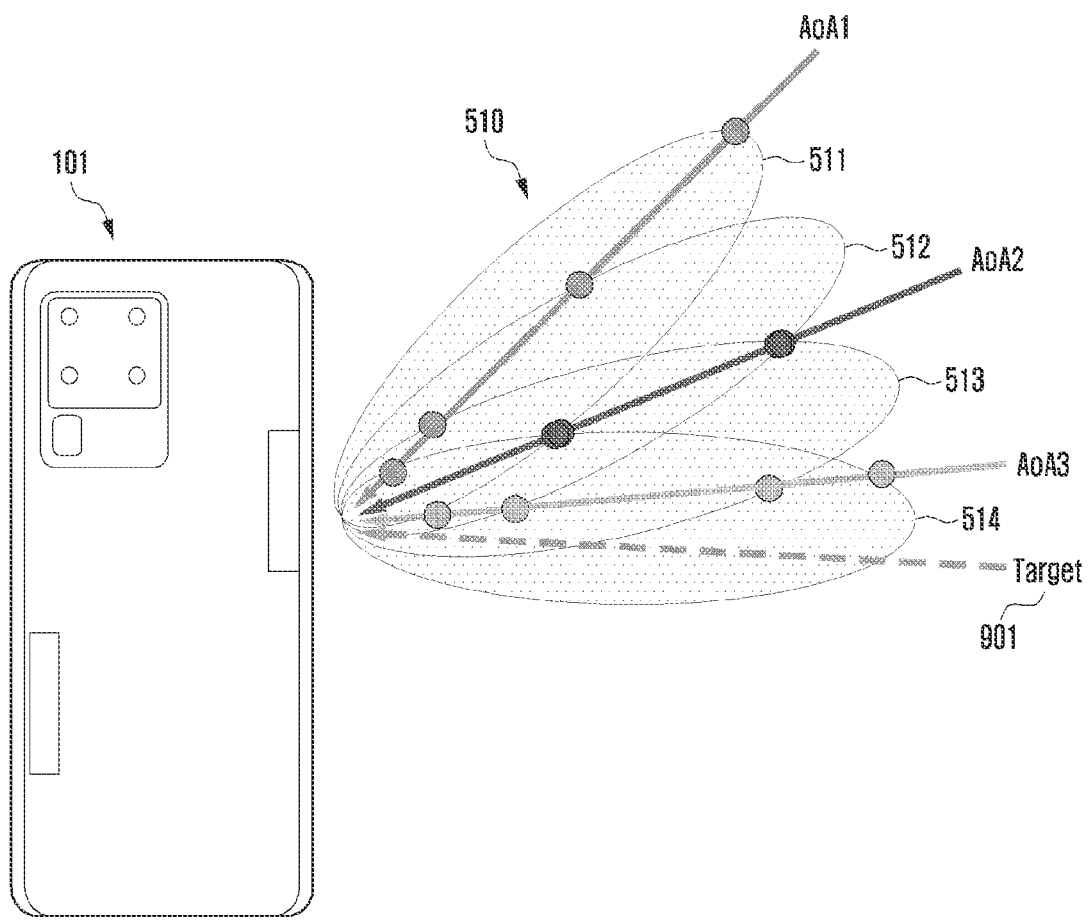
FIG. 9 illustrates a reception beam that an electronic device forms and an angle of arrival (AoA) according to an embodiment.

FIG. 9 illustrates a reception beam that an electronic device forms and an AoA according to an embodiment.

Referring to FIG. 9, the electronic device 101 may form the reception beam set 510 including a plurality of reception beams (e.g., RS0 511, RX1 512, RX2 513, and/or RX3 514). A first signal that the electronic device 101 receives from the outside (e.g., a base station) may form various AoAs including AoA1, AoA2, or AoA3. Although description will be provided based on three AoAs for ease of description, the disclosure is not limited thereto. An appropriate reception beam may differ depending on an AoA. An appropriate reception beam may have the greatest signal quality among a plurality of reception beams included in the reception beam set 510. There are various criteria for determining the quality, such as by using an SNR, an RSRP, an RSSI, and/or an RSRQ. In FIG. 9, a reception beam most appropriate for a signal having AoA1 may be RX0 511. In the case of AoA2, RX 512 or RX2 513 may be the appropriate reception beam. In the case of AoA3, RX3 514 may be the appropriate reception beam.

The electronic device 101 may receive a first signal from the base station and may transmit a second signal to the base station in order to communicate with a network. In order to stably transmit a signal to the external device, the electronic device 101 may transmit a second signal using a transmission beam having an angle of departure (AoD) corresponding to the AoA of a first signal. The electronic device 101 may receive a first signal from the base station and may estimate an AoA 901 of the first signal.

Figure 10:
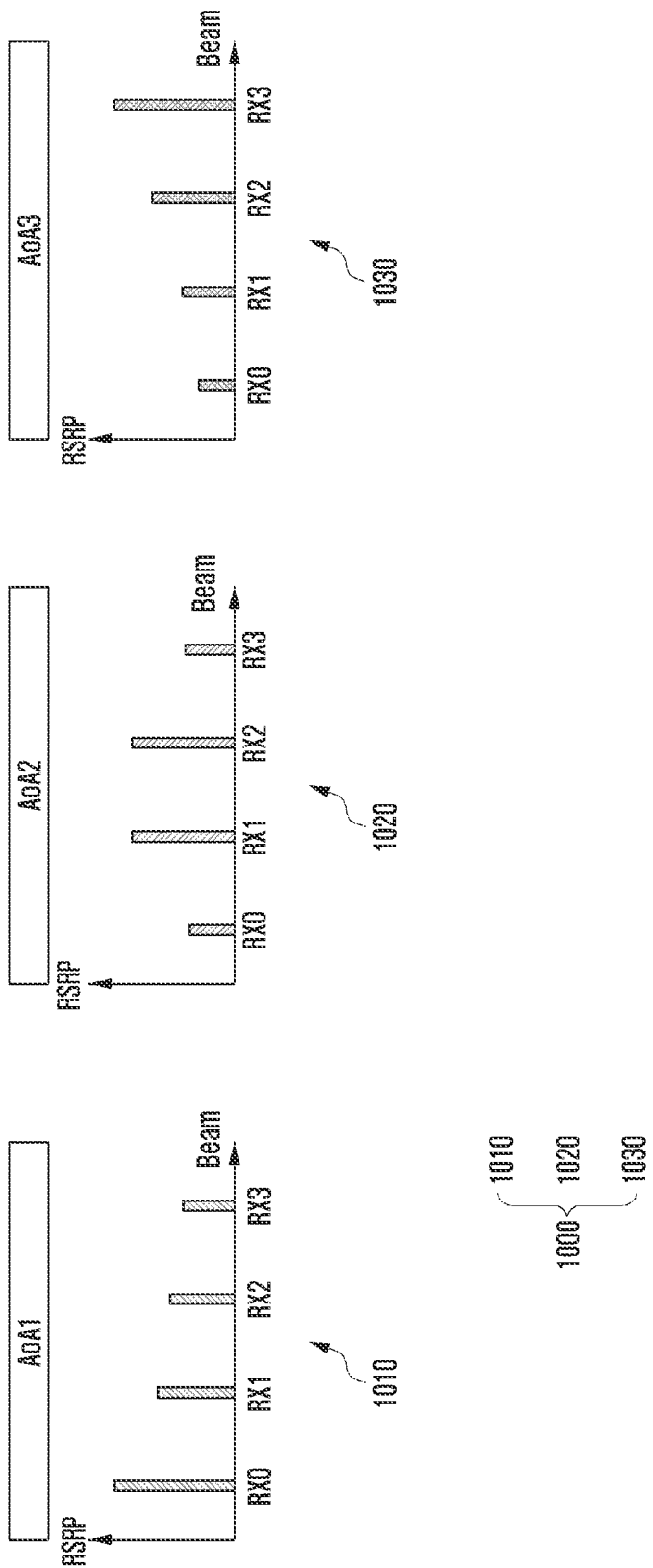
FIG. 10 illustrates a reception signal received power (RSRP) distribution of each reception beam for each AoA according to an embodiment.

FIG. 10 illustrates a distribution of an RSRP of each reception beam for each AoA according to an embodiment.

Referring to FIG. 10, the electronic device 101 may store first information in the memory 130. The first information 1000 is related to a quality distribution of a reception signal for each reception beam for each AoA. For example, the first information may include data obtained by measuring, for each AoA, the distribution of an RSRP of each of the plurality of reception beams. In FIG. 10, the first information may include information associated with an RSRP distribution at AoA1 (1010), an RSRP distribution at AoA2 (1020), and an RSRP distribution at AoA3 (1030). The first information may be experimental data including a previously measured result value, or may be simulation data including a result value calculated in advance in association with a predetermined situation. The electronic device 101 may identify the stored first information.

Figure 11:
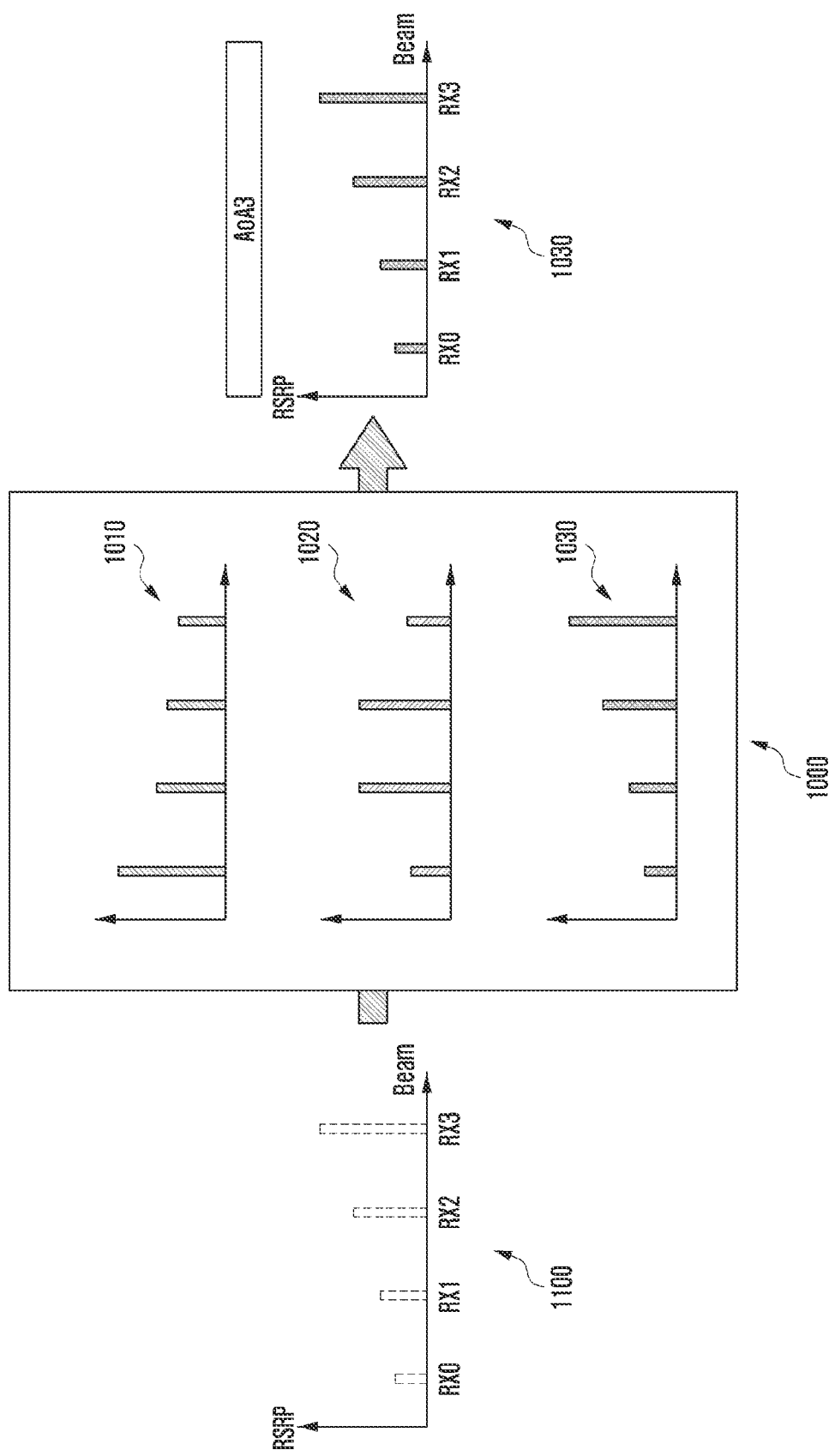
FIG. 11 illustrates an operation of estimating an AoA using a real-time RSRP distribution according to an embodiment.

FIG. 11 illustrates an operation of estimating an AoA using a real-time RSRP distribution according to an embodiment.

Referring to FIG. 11, the electronic device 101 may identify second information 1100, and may estimate the AoA of a first signal based on the first information 1000 and the second information 1100. The second information 1100 may be related to the distribution of quality information of a signal received in real time from the base station. The real-time quality information distribution may be associated with the reception strength of a first signal that each reception beam receives in real time. The second information 1110 may be related to the distribution of the RSRP of a first signal that each reception beam receives in real time. The electronic device 101 may produce and/or identify the second information 1110 in real time.

The electronic device 101 may estimate the AoA 901 of a first signal based on the first information 1000 and the second information 1110. The electronic device 101 may calculate and/or identify a correlation between the first information 1000 and the second information 1100, and may estimate the AoA 901 of the received first signal. The first information 1000 may include information related to an RSRP distribution of each reception beam for each AoA, and the second information 1100 may include an RSRP value for each reception beam in real time. Thus, an AoA may be estimated by identifying a correlation between the first information 1000 and the second information 1100. For example, an AoA (e.g., AoA3) corresponding to a distribution (1030) having the highest correlation with the second information 1100 among the AoA-based distributions included in the first information 1000 may be estimated as the AoA of the first signal.

FIG. 12 illustrates an operation of selecting a transmission beam using an estimated AoA and an EIRP distribution for each transmission beam according to an embodiment.

Referring to FIG. 12, the electronic device 101 may select a transmission beam based on the estimated AoA AoA3 of FIG. 9) of a first signal. The electronic device 101 may select a transmission beam based on the estimated AoA of the first signal and third information 1200. The third information 1200 may include information related to an EIRP for each AoA, for each of a plurality of transmission beams that the electronic device 101 is capable of forming. The memory 130 may store the third information 1200 in advance. The electronic device 101 may select a transmission beam having the highest radiation strength at the estimated AoA, from the beam set corresponding to a second number of antenna elements.

In FIG. 12, based on the third information 1200, a transmission beam having the highest EIRP value at the estimated AoA may be TX1 532. The electronic device 101 may select, as a transmission beam, TX1 532 having the highest EIRP at the estimated AoA from among the plurality of transmission beams (e.g., TX0 531, TX1 532, and/or TX2 533), and may transmit a second signal to the base station using TX1 532.

Figure 13:
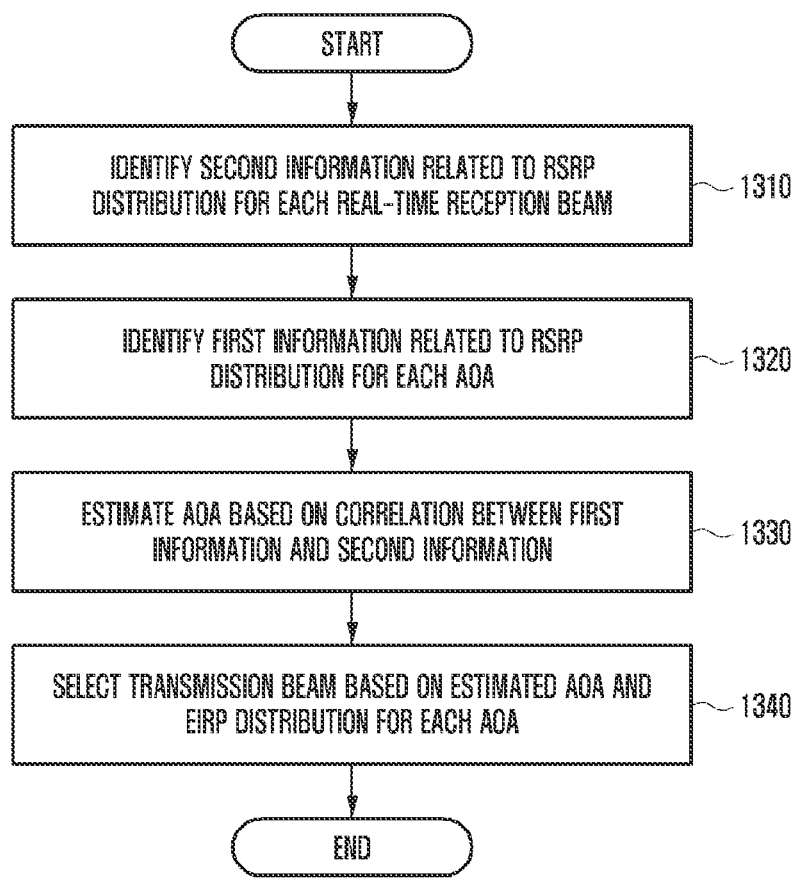
FIG. 13 illustrates an operation of selecting a transmission beam based on estimation of an AoA by an electronic device according to an embodiment.

FIG. 13 illustrates an operation of selecting a transmission beam based on estimation of an AoA by an electronic device according to an embodiment.

Referring to FIG. 13, each operation that the electronic device performs in order to select a transmission beam based on estimation of an AoA may be understood as each operation performed by a processor of the electronic device. The steps included in FIG. 13 may be performed in a different order or may be replaced with similar steps.

In step 1310, the processor may identify second information. In step 1320, the processor may identify first information. The first information may be information related to an RSRP distribution of a first signal for each AoA. For example, the RSRP distribution may include the distribution of the reception strength of a first signal that each reception beam formed by the electronic device is capable of receiving as an AoA changes. The first information may be information stored in advance in a memory (e.g., the memory of FIG. 4). The second information may be information related to a real-time RSRP distribution including information associated with the reception strength of a first signal that each reception beam receives in real time. The processor may produce and/or identify the second information in real time. The processor may identify the first information and the second information. In step 1310, the processor may identify the real-time reception strength of each of a plurality of formed reception beams and may produce the first information related to the RSRP of the first signal in association with the plurality of reception beams. In step 1320, the processor may identify the first information that is stored in advance in the memory, and that is related to the reception strength of the first signal of the plurality of reception beams for each AoA.

In steps 1330 and 1340, the processor may select a transmission beam based on estimation of an AoA.

Specifically, in step 1330, the processor may estimate an AoA based on the first information and the second information. The processor may calculate and/or identify a correlation between the first information and the second information and may estimate the AoA of the received first signal. The first information may be related to an RSRP distribution of each reception beam for each AoA, and the second information may include an RSRP value for each reception beam in real time. Thus, an AoA may be estimated by identifying a correlation. For example, an AoA corresponding to a distribution having the highest correlation with the second information among the AoA-based distributions included in the first information may be estimated as the AoA of the first signal.

In step 1340, the processor may select a transmission beam based on the estimated AoA and an EIRP distribution based on an AoA. The processor may select a transmission beam based on the estimated AoA of the first signal. The processor may select a transmission beam based on the AoA of the first signal and the third information. The third information may include information related to an EIRP for each AoA, for each of a plurality of transmission beams that the electronic device is capable of forming. The memory may store third information in advance. The processor may select a transmission beam having the highest radiation strength at the estimated AoA, from the beam set corresponding to the second number of antenna elements.

Figure 14:
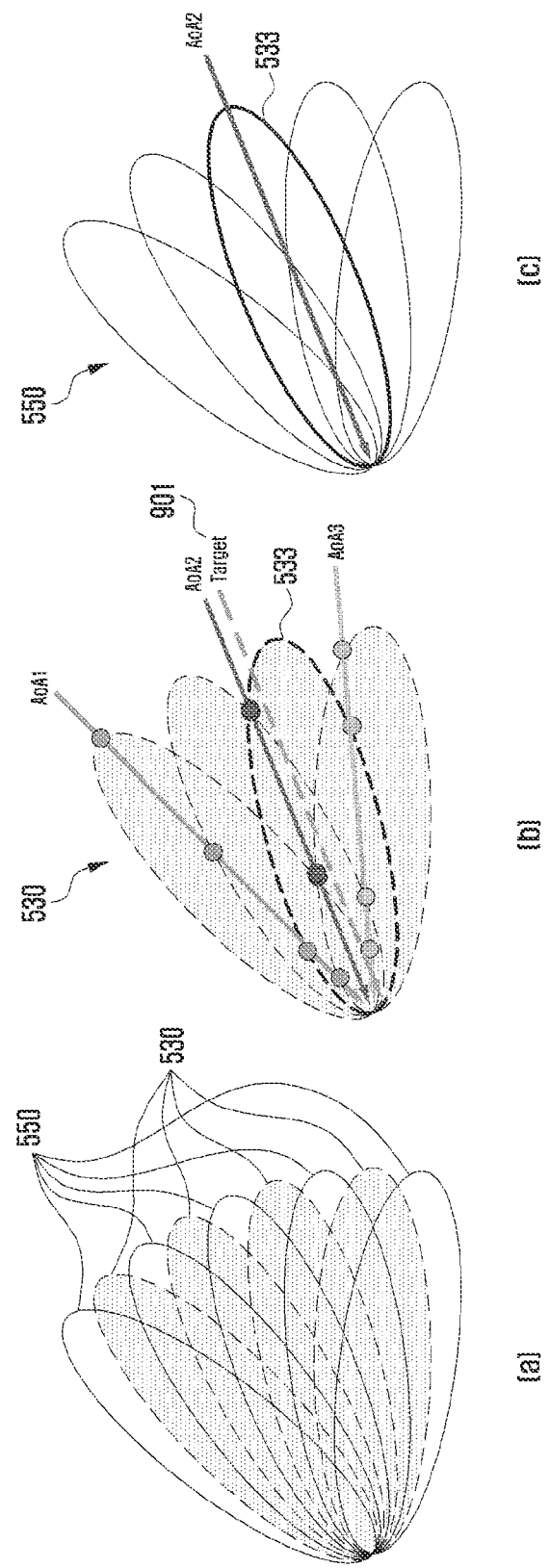
FIG. 14 illustrates an operation of selecting a transmission beam of an additional frequency band based on estimation of an AoA in the case of carrier aggregation (CA) according to an embodiment.

FIG. 14 illustrates an operation of selecting a transmission beam of an additional frequency band based on estimation of an AoA in the case of CA according to an embodiment.

Referring to section [a] of FIG. 14, an electronic device may perform CA. While performing communication using a beam set 530 of an existing frequency band, the electronic device 101 may perform communication by adding a beam of an additional frequency band that is adjacent to or is spaced apart from the existing frequency band of an existing transmission beam, reception beam, and/or first signal. When performing CA, the electronic device 101 may form a beam set 550 of the additional frequency band, and may receive a signal including the additional frequency band. When receiving a signal of the additional frequency band, the electronic device 101 may form the additional beam set 550 based on beam set information corresponding to the additional frequency band.

Referring to section [b] of FIG. 14, the electronic device 101 may estimate the AoA 901 of a first signal using the existing beam set 530. The electronic device 101 may be completing estimation of the AoA 901 of the first signal received from the base station, while performing communication using the existing beam set 530. Alternatively, the electronic device 101 may initiate CA, and may estimate the AoA 901 of the first signal. The first signal may be a signal including the existing frequency band. The electronic device 101 may select, based on the estimation of the AoA 901 of the first signal, a predetermined transmission beam 533 from among a plurality of transmission beams included in the existing beam set 530. In the case of performing CA, even when the electronic device 101 receives a signal of a frequency band different from the existing frequency, the electronic device 101 may receive a first signal of the existing frequency band and a signal of the additional frequency band from identical base station and/or base stations in adjacent locations. Referring to section [b] of FIG. 14, the electronic device 101 may estimate that that the AoA 901 of the first signal is AoA2. The estimation of an AoA may be performed based on the distribution (e.g., second information) of the reception strength of the first signal and the distribution (e.g., first information) of the reception strength of a signal for each AoA. For example, the electronic device 101 may estimate the estimated AoA (AoA2) of the first signal to be an AoA that is identical to that of a signal of the additional frequency band.

Referring to section [c] of FIG. 14, the electronic device 101 may select, based on the estimated AoA (AoA2) of the first signal, at least one transmission beam from among a plurality of transmission beams included in the additional beam set 550 including the additional frequency band. The selection of a transmission beam based on the estimated AoA (AoA2) may be performed based on beam set information. For example, the beam set information may include information in which an AoA is mapped to each of the plurality of transmission beams. As another example, the electronic device 101 may identify third information related to the EIRP of a beam for each AoA and may select a transmission beam based on an AoA in real time. The electronic device 101 may store, in the memory 130, correspondence information in which the transmission beam 533 of the existing frequency and a transmission beam 553 of the additional frequency band are mapped. The electronic device 101 may select the transmission beam 553 of the additional frequency based on the transmission beam 533 of the existing frequency selected based on the correspondence information and the estimated AoA (AoA2).

The electronic device 101 may store, in the memory 130, third information related to a radiation strength for each AoA for each of a plurality of transmission beams included in the transmission beam set 550 of the additional frequency band. The electronic device 101 may identify the third information, and may select at least one transmission beam 553 in order of the highest radiation strength at the estimated AoA (AoA2). The electronic device 101 may transmit, using the selected transmission beam 553, a signal of the additional frequency band to the base station.

Figure 15:
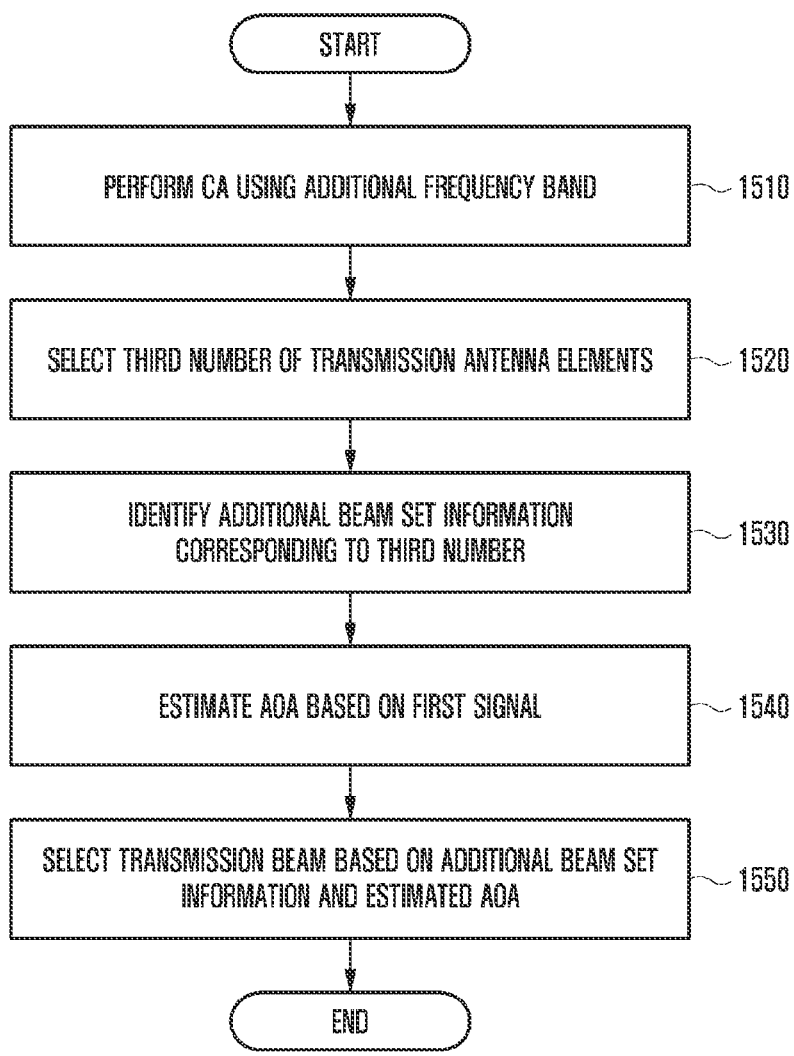
FIG. 15 illustrates an operation of selecting a transmission beam of an additional frequency band in the case of CA, by an electronic device according to an embodiment.

FIG. 15 illustrates an operation of selecting a transmission beam of an additional frequency band in the case of CA, by an electronic device according to an embodiment.

Referring to FIG. 15, each operation that the electronic device performs in order to select a transmission beam of an additional frequency in a CA situation, may be understood as each operation performed by a processor of the electronic device. The steps included in FIG. 15 may be performed in a different order or may be replaced with similar steps.

In step 1510, the processor may perform CA using an additional frequency band. The processor may receive a signal of an additional frequency band from the base station. If the base station desires to perform CA, the electronic device may receive a signal of an additional frequency band different from a first signal of an existing frequency band. When a signal of the additional frequency band is received, the processor may additionally form a reception beam of the frequency band aggregated. Beam set information corresponding to the additional frequency band may be different from a beam set corresponding to the existing frequency band. The processor may form a plurality of reception beams corresponding to the additional frequency band in addition to the beam set corresponding to the existing frequency band.

In step 1520, the processor may control an antenna module and may select a third number of antenna elements in order to transmit a signal of the additional frequency band to an existing device. The processor may select the third number of antenna elements from among the antenna arrays included in the antenna module, and may form a transmission beam, in order to transmit or receive a signal of the additional frequency band.

In step 1530, the processor may identify additional beam set information corresponding to the third number of selected antenna elements. The additional beam set information may correspond to the third number of antenna elements, and may include information related to a plurality of transmission beams corresponding to the additional frequency band. When CA initiates, the electronic device may be performing transmission or reception of a signal of the existing frequency band with an external device, using a reception beam formed in advance. This transmission or reception may be after reception of a first signal (e.g., a reference signal) of the existing frequency band from an external device.

In step 1540, the processor may estimate an AoA based on the first signal. A memory (may store information associated with the AoA of the first signal estimated based on the reception strength of the first signal. For example, while performing transmission and reception of a signal with an external device via the existing frequency band, the processor may estimate the AoA of the first signal received from the external device. Estimation of an AoA may be performed before initiation of CA, at the time of initiating CA, or after initiation of CA.

In step 1550, the processor may select, based on the estimated AoA, at least one beam from a plurality of added transmission beams. The memory may pre-store correspondence information between an additional beam set and an estimated AoA. The processor may select a transmission beam based on the estimated AoA and additional beam set information based on the correspondence information. The processor may estimate the AoA of a signal received from the base station using at least one of the reception beams of the existing frequency band and may select a transmission beam of the additional frequency band using the estimated AoA. The transmission beam may be selected based on the EIRP at the estimated AoA, for each of the transmission beams included in an additional transmission beam set.

As described above, an electronic device herein may include an antenna module including a plurality of antenna elements and a processor operatively connected to the antenna module, wherein the processor is configured to form a plurality of reception beams by selecting a first number of antenna elements among the plurality of antenna elements, to receive a first signal from an external device using the plurality of reception beams, to select a second number of antenna elements in order to transmit a signal to an external device, the second number being less than the first number, to identify beam set information related to a plurality of transmission beam sets capable of being formed using the second number of antenna elements, to select at least one transmission beam from the transmission beam sets based on quality information of the first signal and the beam set information, and to transmit a second signal to the external device using the selected transmission beam.

The beam set information may include correspondence information in which the plurality of reception beams and the plurality of transmission beams are mapped, and the processor is configured to select, based on quality information of the first signal, at least one of the plurality of reception beams, and to select the transmission beam based on the selected reception beam and the correspondence information.

The processor may be configured to estimate, based on the quality information of the first signal, an AoA of the first signal, and to select, based on the estimated AoA, at least one transmission beam from the transmission beam sets.

The electronic device may further include a memory storing first information related to a distribution of quality information with variation of an AoA for each of the plurality of reception beams, and the processor may be configured to obtain second information related to real-time quality information of the first signal for each reception beam, and to estimate the AoA based on the first information and the second information.

The electronic device may further include a memory storing third information related to EIRP with variation of an AoA for each of the plurality of transmission beams, and the processor may be configured to select at least one transmission beam based on the estimated AoA and the third information.

The first signal may include a reference signal, and the quality information may include RSRP information associated with the first signal.

The antenna module may include at least one array antenna having a plurality of antenna elements.

When a signal of an additional frequency band that is different from a frequency band of the plurality of formed reception beams is received from the external device, the processor may be configured to additionally form a plurality of reception beams of the additional frequency band, to allocate a third number of antenna elements to the transmission antenna, to identify beam set information added in association with an additional transmission beam set capable of being formed based on the third number of antenna elements and the additional frequency band, to receive the first signal using the plurality of reception beams, to estimate an AoA of the first signal based on quality information of the first signal, and to select, based on the estimated AoA and the beam set information added, at least one transmission beam from the additional transmission beam set.

In a normal mode, the processor may be configured to allocate the first number of antenna elements to the transmission antenna, and to select a transmission beam based on information associated with a plurality of transmission beam sets corresponding to the first number of antenna elements, and in a low-power mode, the processor is configured to allocate the second number of antenna elements to the transmission antenna.

The first signal and the second signal may include mmWave bands.

The beam set information may include codebook information that controls beamforming of the transmission antenna and the reception antenna, and the processor may be configured to support communication of a beamforming scheme that is based on the codebook information.

As described above, a method of selecting, by an electronic device, a transmission beam for an external device, may include forming a plurality of reception beams by allocating a first number of antenna elements to a reception antenna, receiving a first signal from an external device using the plurality of reception beams, allocating a second number of antenna elements to a transmission antenna, the second number being less than the first number, identifying beam set information related to a plurality of transmission beam sets that the transmission antenna is capable of forming based on the second number of antenna elements, selecting, based on quality information of the first signal and the beam set information, at least one transmission beam from the transmission beam sets, and transmitting a second signal to the external device using the selected transmission beam.

The beam set information may include correspondence information associated with the plurality of transmission beams that respectively correspond to the plurality of reception beams, and the operation of selecting the transmission beam may include selecting at least one of the plurality of reception beams based on the quality information of the first signal, and selecting the transmission beam based on the selected reception beam and the correspondence information.

Selecting the transmission beam based on the quality information may include estimating, based on the quality information of the first signal, an AoA of the first signal, and selecting, based on the estimated AoA, at least one transmission beam from transmission beam sets.

The method may include identifying first information related to a distribution of the quality information with variation of an AoA for each of the plurality of reception beams, obtaining second information related to real-time quality information of the first signal for each reception beam, and estimating the AoA based on the first information and the second information.

The method may include identifying third information related to an EIRP with variation of an AoA for each of the plurality of transmission beams, and selecting, based on the estimated AoA and the third information, the at least one transmission beam.

The first signal may include a reference signal, and the quality information may include RSRP information associated with the first signal.

If a signal of an additional frequency band that is different from a frequency band of the plurality of formed reception beams is received from the external device, the method may include additionally forming a plurality of reception beams of the additional frequency band, allocating a third number of antenna elements to the transmission antenna, identifying beam set information added in association with an additional transmission beam set capable of being formed based on the third number of antenna elements and the additional frequency band, receiving the first signal using the plurality of reception beams, estimating an AoA of the first signal based on the quality information of the first signal, and selecting, based on the estimated AoA and the beam set information added, at least one transmission beam from the additional transmission beam set.

In a normal mode, the method may include allocating the first number of antenna elements to the transmission antenna and selecting a transmission beam based on information related to the plurality of transmission beam sets corresponding to the first number of antenna elements, and in a low-power mode, the method may include allocating the second number of antenna elements to the transmission antenna.

As used herein, the term module may include a unit implemented in hardware, software, or firmware, and may be interchangeably used with other terms "logic," "logic block," "component," or "circuit". The module may be a minimum unit of a single integrated component adapted to perform one or more functions, or a part thereof. For example, according to an embodiment, the module may be implemented in the form of an application-specific integrated circuit (ASIC).

Various embodiments as set forth herein may be implemented as software including one or more instructions that are stored in a storage medium that is readable by a machine. For example, a processor (of the machine may invoke at least one of the one or more instructions stored in the storage medium, and execute the instructions. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term non-transitory indicates that the storage medium is a tangible device, and does not include a signal, but this term does not differentiate between where data is semi-permanently stored in the storage medium and where the data is temporarily stored in the storage medium.

A method of the disclosure may be included and provided in a computer program product, The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each element (e.g., a module or a program) of the above-described elements may include a single entity or multiple entities, and some of the multiple entities may be separately disposed in any other element. One or more of the above-described elements may be omitted, or one or more other elements may be added. Alternatively or additionally, a plurality of elements (e.g., modules or programs) may be integrated into a single element. In such a case, the integrated element may still perform one or more functions of each of the plurality of elements in the same or similar manner as they are performed by a corresponding one of the plurality of elements before the integration. Operations performed by the module, the program, or another element may be carried out sequentially, in parallel, repeatedly, or heuristically, or one or more of the steps may be executed in a different order or omitted, or one or more other operations may be added.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device comprising:
    an antenna comprising a plurality of antenna elements; and
    a processor operatively connected to the antenna,
    wherein the processor is configured to:
        form a plurality of reception beams by selecting a first number of antenna elements among the plurality of antenna elements,
        receive a first signal from an external device using the plurality of reception beams,
        in a low-power mode:
            select a second number of antenna elements that are used to transmit a signal to an external device, the second number being less than the first number,
            identify beam set information related to a plurality of transmission beam sets capable of being formed using the second number of antenna elements, and
            select, based on quality information of the first signal and the beam set information, at least one transmission beam from the transmission beam sets, in a normal mode:
            allocate the first number of antenna elements to a transmission antenna, and
            select a transmission beam based on information associated with a plurality of transmission beam sets corresponding to the first number of antenna elements, and
        transmit a second signal to the external device using the selected transmission beam.

2. The electronic device of claim 1,
    wherein the beam set information comprises correspondence information in which the plurality of reception beams and the plurality of transmission beams are mapped, and
    wherein the processor is further configured to:
        select, based on the quality information of the first signal, at least one of the plurality of reception beams, and
        select the transmission beam based on the selected reception beam and the correspondence information.

3. The electronic device of claim 1, wherein the processor is further configured to:
- estimate, based on the quality information of the first signal, an angle of arrival (AoA) of the first signal, and
- select, based on the estimated AoA, at least one transmission beam from the transmission beam sets.

4. The electronic device of claim 3, further comprising:
a memory storing first information related to a distribution of the quality information with variation of the AoA for each of the plurality of reception beams,
wherein the processor is further configured to:
- obtain second information related to real-time quality information of the first signal for each reception beam, and
- estimate the AoA based on the first information and the second information.

5. The electronic device of claim 3, further comprising:
a memory storing third information related to effective isotropic radiated power (EIRP) with variation of the AoA for each of the plurality of transmission beams,
wherein the processor is further configured to select at least one transmission beam based on the estimated AoA and the third information.

6. The electronic device of claim 1,
wherein the first signal comprises a reference signal, and
wherein the quality information comprises reference signal receiving power (RSRP) information associated with the first signal.

7. The electronic device of claim 1,
wherein the antenna comprises at least one array antenna, and
wherein the array antenna comprises a plurality of antenna elements.

8. The electronic device of claim 3, wherein, if a signal of an additional frequency band that is different from a frequency band of the plurality of formed reception beams is received from the external device, the processor is further configured to:
- additionally form a plurality of reception beams of the additional frequency band,
- allocate a third number of antenna elements to a transmission antenna,
- identify beam set information added in association with an additional transmission beam set capable of being formed based on the third number of antenna elements and the additional frequency band,
- receive the first signal using the plurality of reception beams,
- estimate the AoA of the first signal based on the quality information of the first signal, and
- select, based on the estimated AoA and the added beam set information, at least one transmission beam from the additional transmission beam set.

9. The electronic device of claim 1,
wherein the first signal and the second signal comprise millimeter waves.

10. The electronic device of claim 1,
wherein the beam set information comprises codebook information that controls beamforming of a transmission antenna and a reception antenna, and
wherein the processor is further configured to support communication of a beamforming scheme based on the codebook information.

11. A method of selecting, by an electronic device, a transmission beam for an external device, the method comprising:
- forming a plurality of reception beams by allocating a first number of antenna elements to a reception antenna;
- receiving a first signal from an external device using the plurality of reception beams;
- in a low-power mode:
  - allocating a second number of antenna elements to a transmission antenna, the second number being less than the first number;
  - identifying beam set information related to a plurality of transmission beam sets that the transmission antenna is capable of forming based on the second number of antenna elements; and
  - selecting, based on quality information of the first signal and the beam set information, at least one transmission beam from the transmission beam sets;
- in a normal mode:
  - allocating the first number of antenna elements to the transmission antenna; and
  - selecting a transmission beam based on information related to the plurality of transmission beam sets corresponding to the first number of antenna elements; and
- transmitting a second signal to the external device using the selected transmission beam.

12. The method of claim 11,
wherein the beam set information comprises correspondence information associated with the plurality of transmission beams that respectively correspond to the plurality of reception beams, and
wherein selecting the at least one transmission beam comprises:
- selecting at least one of the plurality of reception beams based on the quality information of the first signal; and
- selecting the at least one transmission beam based on the selected reception beam and the correspondence information.

13. The method of claim 11, wherein selecting the at least one transmission beam based on the quality information comprises:
- estimating, based on the quality information of the first signal, an angle of arrival (AoA) of the first signal; and
- selecting, based on the estimated AoA, at least one transmission beam from transmission beam sets.

14. The method of claim 13, further comprising:
- identifying first information related to a distribution of the quality information with variation of an AoA for each of the plurality of reception beams;
- obtaining second information related to real-time quality information of the first signal for each reception beam; and
- estimating the AoA based on the first information and the second information.

15. The method of claim 13, further comprising:
- identifying third information related to effective isotropic radiated power (EIRP) with variation of an AoA for each of the plurality of transmission beams; and
- selecting the at least one transmission beam based on the estimated AoA and the third information.

16. The method of claim 11,
wherein the first signal comprises a reference signal, and
wherein the quality information comprises reference signal receiving power (RSRP) information associated with the first signal.

17. The method of claim 11, further comprising:
if a signal of an additional frequency band that is different from a frequency band of the plurality of formed reception beams is received from the external device, additionally forming a plurality of reception beams of the additional frequency band;
allocating a third number of antenna elements to the transmission antenna;
identifying beam set information added in association with an additional transmission beam set capable of being formed based on the third number of antenna elements and the additional frequency band;
receiving the first signal using the plurality of reception beams;
estimating an AoA of the first signal based on the quality information of the first signal; and
selecting at least one transmission beam from the additional transmission beam set based on the estimated AoA and the added beam set information.

* * * * *